US009753903B2

(12) United States Patent
Nakazawa

(10) Patent No.: US 9,753,903 B2
(45) Date of Patent: Sep. 5, 2017

(54) INFORMATION PROCESSING TERMINAL, PROCESSING APPARATUS, AND CONTROL METHOD

(71) Applicant: CANON KABUSHIKI KAISHA, Tokyo (JP)

(72) Inventor: Toshiyuki Nakazawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 293 days.

(21) Appl. No.: 14/595,071

(22) Filed: Jan. 12, 2015

(65) Prior Publication Data

US 2015/0199310 A1    Jul. 16, 2015

(30) Foreign Application Priority Data

Jan. 15, 2014 (JP) .................................. 2014-005183

(51) Int. Cl.
*G06F 15/173* (2006.01)
*G06F 17/22* (2006.01)
*G06F 17/30* (2006.01)

(52) U.S. Cl.
CPC .... *G06F 17/2247* (2013.01); *G06F 17/30893* (2013.01)

(58) Field of Classification Search
CPC . G06F 17/2247; G06F 17/80893; H04L 41/14
USPC ............................................. 709/203, 226
See application file for complete search history.

(56) References Cited

U.S. PATENT DOCUMENTS

| 7,762,453 B2* | 7/2010 | Lapstun | G06F 3/03545 235/375 |
| 8,019,929 B2* | 9/2011 | Kimura | G06F 1/305 365/228 |
| 8,511,565 B2* | 8/2013 | Lapstun | G06F 17/30864 235/487 |

(Continued)

FOREIGN PATENT DOCUMENTS

JP    2012-048457 A    3/2012

OTHER PUBLICATIONS

Sony—Make-Believe; "W3C Web Intents;" Local Network Service, W3C TPAC Oct. 31, 2012; pp. 1-12; XP055191778.

(Continued)

*Primary Examiner* — Frantz Jean
(74) *Attorney, Agent, or Firm* — Canon USA, Inc. IP Division

(57) ABSTRACT

A service transmits information required to selectively register a plurality of pieces of function information (that belongs to a same category) corresponding to processing performed based on different settings of a function provided by the service, to be registered in an UA, to the UA. The UA receives the above-mentioned information and performs function information registration processing using the relay function, according to a selection based on the received information. Then, the UA requests the service, according to a designation of specific data and a selection of registered function information, to process the specific data based on settings corresponding to the selected function information. In response to the request, the service processes the specific data based on the settings corresponding to the selected function information.

21 Claims, 23 Drawing Sheets

(56) References Cited

U.S. PATENT DOCUMENTS

2012/0117629 A1* 5/2012 Miyazawa .............. H04L 63/08
726/4
2012/0254389 A1* 10/2012 Amemiya ........... H04L 67/1027
709/223
2013/0060889 A1* 3/2013 Miyazawa .............. H04L 63/08
709/217

OTHER PUBLICATIONS

Claes Nilsson, Norifumi Kikkawa; "W3C—Web Intents Addendum—Local Services;" W3C Working Draft Oct. 4, 2012; pp. 1-13; XP55191775.
Greg Billock; James Hawkins , Paul Kinlan; "W3C—Web Intents;" W3C Working Group Note Oct. 23, 2013; pp. 1-18; XP55153175.
UPnP Forum; "UPnP Device Architecture 1.1;" Oct. 15, 2008; pp. 1-136; XP002521470.
Yuri Nagahara, et al.; "Distributed Intent: Android Framework for Networked Devices Operation;" 2013 IEEE 16th International Conference on Computational Science and Engineering; pp. 1-8; XP032573241.

* cited by examiner

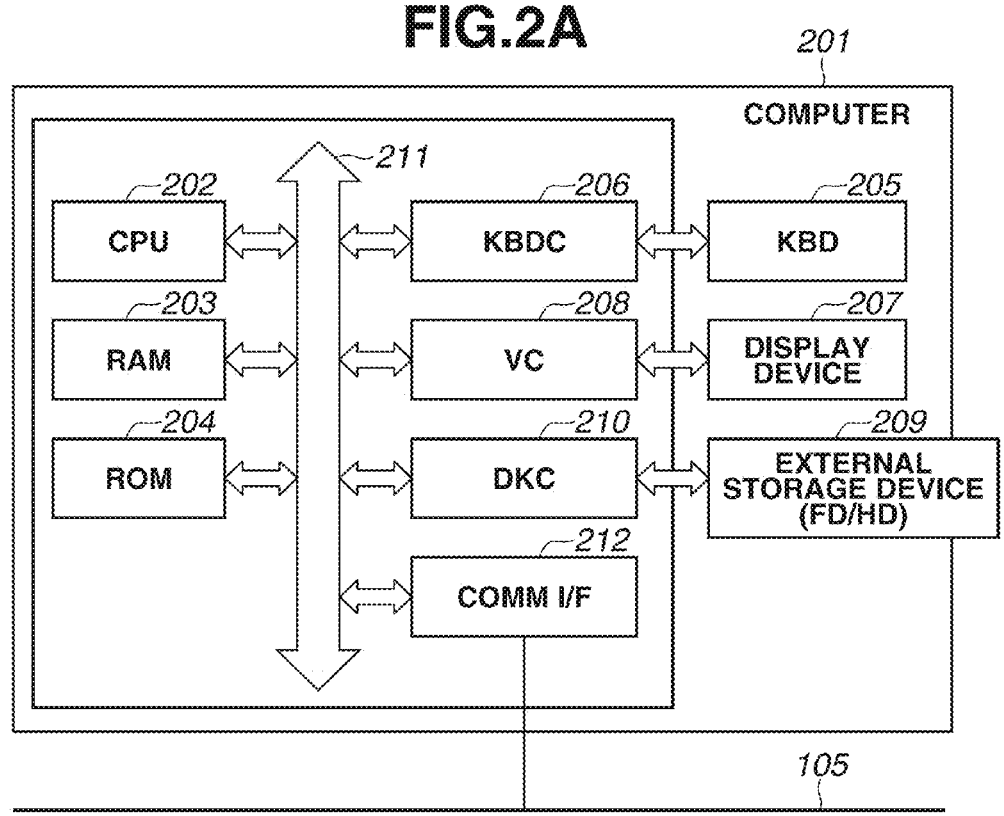
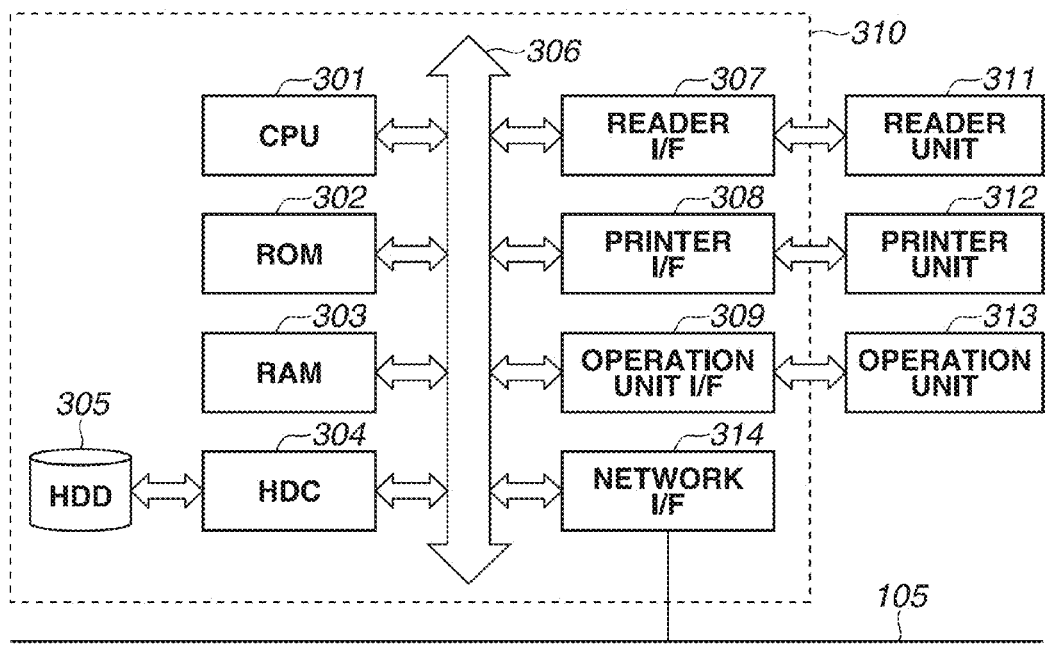

FIG.4A

```
<intent
  action="http://webintents.org/share"
  type="image/*"
  href="share.html"
  title="Share image using e-mail"
  disposition="window"
/>
```

FIG.4B

```
document.getElementById('share-photo').addEventListener(
    "click", function(){
    var intent = new Intent(
        {"action":"http://webintents.org/share",
        "type":"image/jpeg",
        "data":getImageFrom("photo.jpeg")});
    navigator.startActivity(intent, onSuccess);
}, false);
```

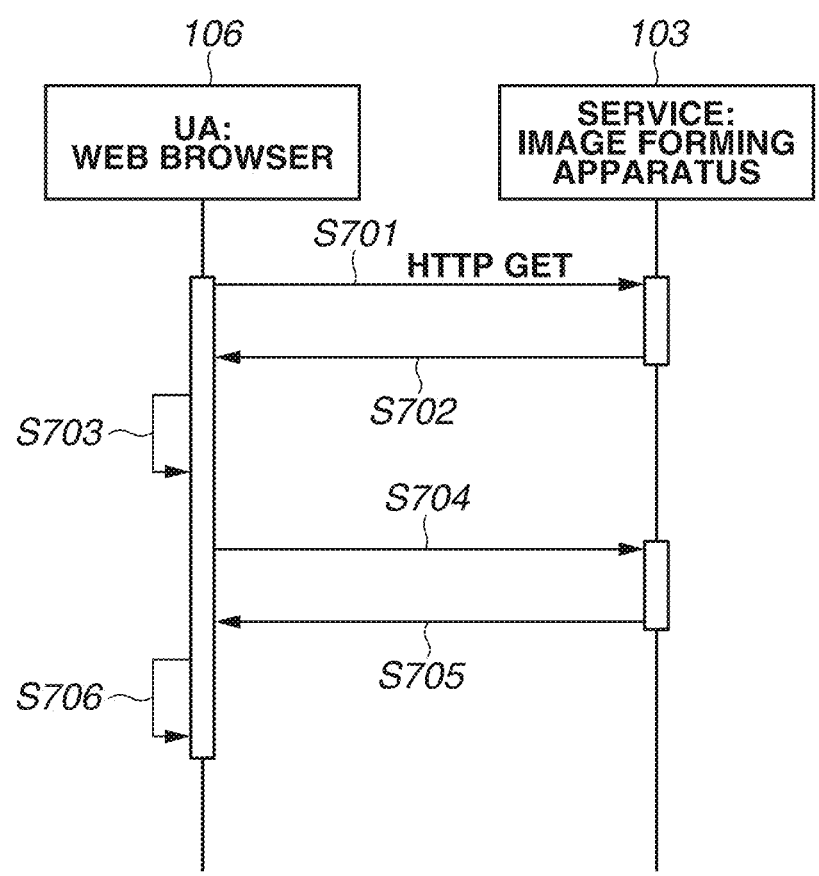

FIG.6

SELECTION OF PRINT SETTINGS TO BE
REGISTERED

- ☑ COLOR/ONE-SIDED
- ☐ COLOR/TWO-SIDED
- ☐ COLOR/ONE-SIDED/2 in 1
- ☑ COLOR/TWO-SIDED/2 in 1
- ☐ MONOCHROME/ONE-SIDED
- ☐ MONOCHROME/TWO-SIDED
- ☐ MONOCHROME/ONE-SIDED/2 in 1
- ☑ MONOCHROME/TWO-SIDED/2 in 1

} 801

[ REGISTRATION ]

```
<intent
 action="http://webintents.org/print"
 type="application/pdf"
 href="print.html?id=p001"
 title="COLOR/ONE-SIDED PRINTING (iR-AD C5035)"
 disposition="window"
/>
<intent
 action="http://webintents.org/print"
 type="application/pdf"
 href="print.html?id=p004"
 title="COLOR/TWO-SIDED/2 in 1 PRINTING (iR-AD C5035)"
 disposition="window"
/>
<intent
 action="http://webintents.org/print"
 type="application/pdf"
 href="print.html?id=p008"
 title="MONOCHROME/TWO-SIDED/2 in 1 PRINTING (iR-AD C5035)"
 disposition="window"
/>
```

901 (braces first intent block)

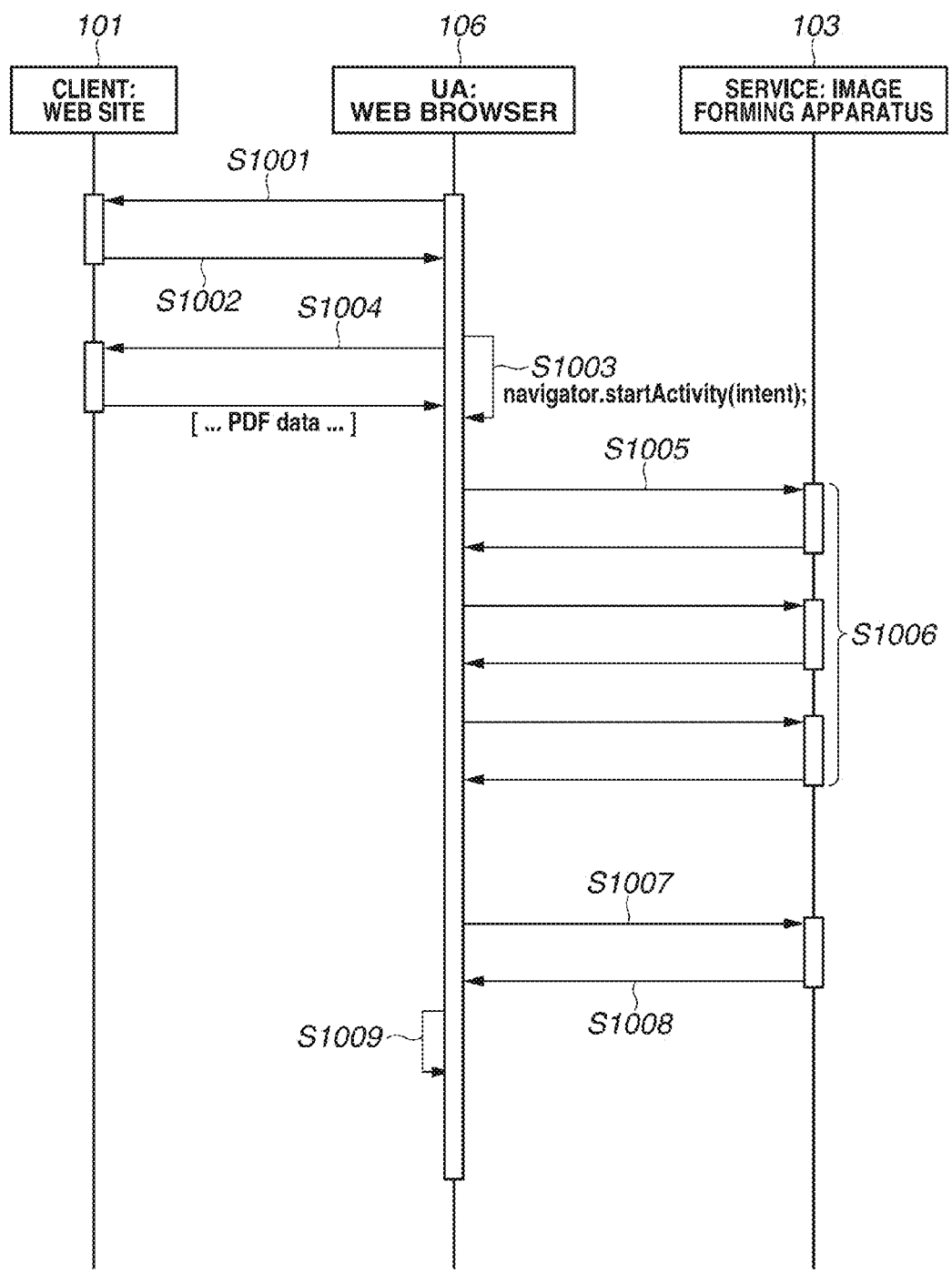

FIG.9

```
<html>
<head>
...
<script type="text/javascript">
function getDocFrom(src)
{
//get document from the 'src'
...
}                                              } 1101 function printUsingWI(src)
{
   var intent = new Intent(
     {"action":"http://webintents.org/print",
      "type":"application/pdf",                } 1102
      "data":getDocFrom(src)});
     navigator.startActivity(intent);
}
</script>
...
</head>
<body>

...
<a href="/finance/2013-1q.pdf">2013-1Q Financial Report</a>
<input type="button" value="Print"                                } 1103
   onclick="printUsingWI('/finance/2013-1q.pdf')" />
...

</body>
</html>
```

FIG.10

```
┌─────────────────────────────────────────────────────────────┬───┐
│ SELECTION OF APPLICATION                                    │ X │
├─────────────────────────────────────────────────────────────┴───┤
│ SELECT DESIRED APPLICATION TO BE USED FOR "PRINT".              │
│                                                                 │
│  ■ COLOR/ONE-SIDED PRINTING (iR-AD C5035)                       │
│  ■ COLOR/TWO-SIDED/2 in 1 PRINTING (iR-AD C5035)                │
│  ■ MONOCHROME/TWO-SIDED PRINTING (iR-AD C5035)                  │
│  ■ MONOCHROME/TWO-SIDED/2 in 1 PRINTING (iR-AD C5035)           │
│  ■ Print PDF using Cloud Printing Service                       │
└─────────────────────────────────────────────────────────────────┘
```

FIG.12A

```
PRINT SETTINGS

1

ORIENTATION OF PRINT:  ◉ PORTRAIT [A]   ○ LANDSCAPE [A]

PAGE LAYOUT:          [ 2 in 1                    ▼ ]
  PLACEMENT ORDER:      [ FROM LEFT TO RIGHT        ▼ ]
  PRINT METHOD:         [ TWO-SIDED PRINT           ▼ ]     ⎫
  COLOR MODE:           [ COLOR                     ▼ ]     ⎬ 1401
  BINDING DIRECTION:    [ SHORT SIDE BINDING (TOP)  ▼ ]     ⎭
  PAPER DISCHARGE
  METHOD:               [ NOT DESIGNATED            ▼ ]
  STAPLE:               [ NOT REQUIRED              ▼ ]

[ PRINT ]
                                                       1402
```

FIG.12B

```
PRINTING OF DOCUMENT HAS BEEN STARTED.

SELECTION OF PRINT SETTINGS TO BE REGISTERED

1606 —
- ☑ COLOR/ONE-SIDED
- ☐ COLOR/TWO-SIDED
- ☐ COLOR/ONE-SIDED/2 in 1
- ☑ COLOR/TWO-SIDED/2 in 1
- ☐ MONOCHROME/ONE-SIDED
- ☐ MONOCHROME/TWO-SIDED
- ☐ MONOCHROME/ONE-SIDED/2 in 1
- ☑ MONOCHROME/TWO-SIDED/2 in 1

} 1601

1607 —
- ☑ GENERAL AFFAIRS DEPARTMENT RECOMMENDED SETTINGS — EDIT  DELETE — 1603
- ☐ SALES DEPARTMENT RECOMMENDED SETTINGS — EDIT  DELETE — 1604

} 1602

[ NEW ADDITION... ] — 1605

[ SAVE ] — 1608

FIG.14

EDITING OF PRINT SETTINGS

REGISTRATION NAME: PUBLIC RELATIONS DEPARTMENT RECOMMENDED SETTINGS

ORIENTATION OF PRINT: ◉ PORTRAIT [A]  ○ LANDSCAPE [A] — 1701

PAGE LAYOUT: 2 in 1

PLACEMENT ORDER: FROM LEFT TO RIGHT

PRINT METHOD: ONE-SIDED PRINT

COLOR MODE: AUTO (MONOCHROME/COLOR) — 1702

BINDING DIRECTION:

PAPER DISCHARGE METHOD: SORT

STAPLE: NOT REQUIRED

PRINT — 1703

FIG.15

SELECTION OF PRINT SETTINGS TO BE REGISTERED

- ☑ GENERAL AFFAIRS DEPARTMENT RECOMMENDED SETTINGS
- ☐ COLOR/ONE-SIDED
- ☑ COLOR/TWO-SIDED/2 in 1
- ☑ MONOCHROME/TWO-SIDED/2 in 1

} 1801

REGISTRATION 1802

FIG.16

```
<intent
  action="http://webintents.org/print"
  type="application/pdf"
  href="print.html?id=c0b0a09f90&rev=cbb2fff04"
  title="GENERAL AFFAIRS DEPARTMENT RECOMMENDED
  SETTINGS-BASED PRINTING (iR-AD C5035)"
  disposition="window"
/>
<intent
  action="http://webintents.org/print"
  type="application/pdf"
  href="print.html?id=p006"
  title="COLOR/TWO-SIDED/2 in 1 PRINTING (iR-AD C5035)"
  disposition="window"
/>
<intent
  action="http://webintents.org/print"
  type="application/pdf"
  href="print.html?id=p010"
  title="MONOCHROME/TWO-SIDED/2 in 1 PRINTING (iR-AD C5035)"
  disposition="window"
/>
```

1901 (braces the first <intent> block)

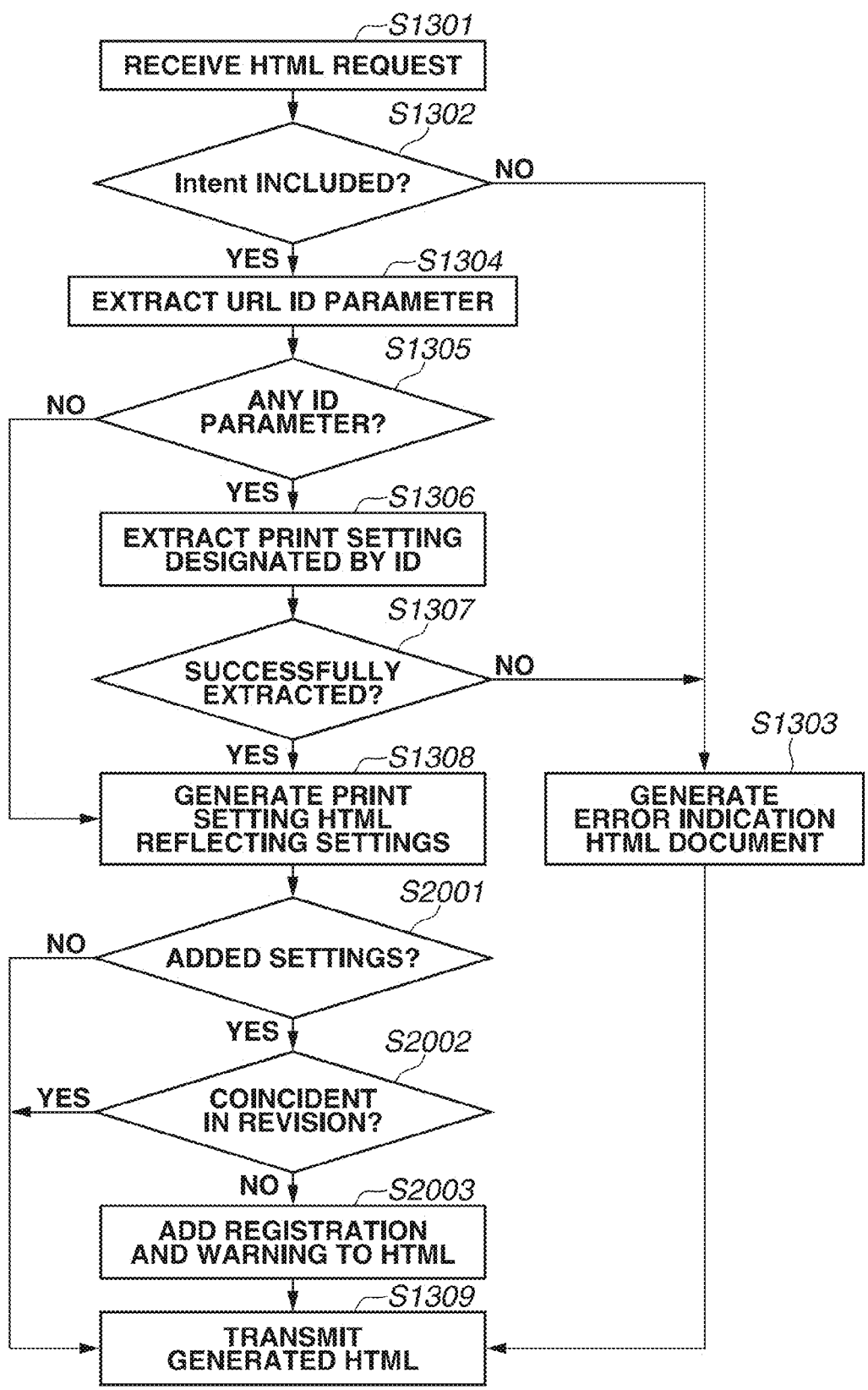

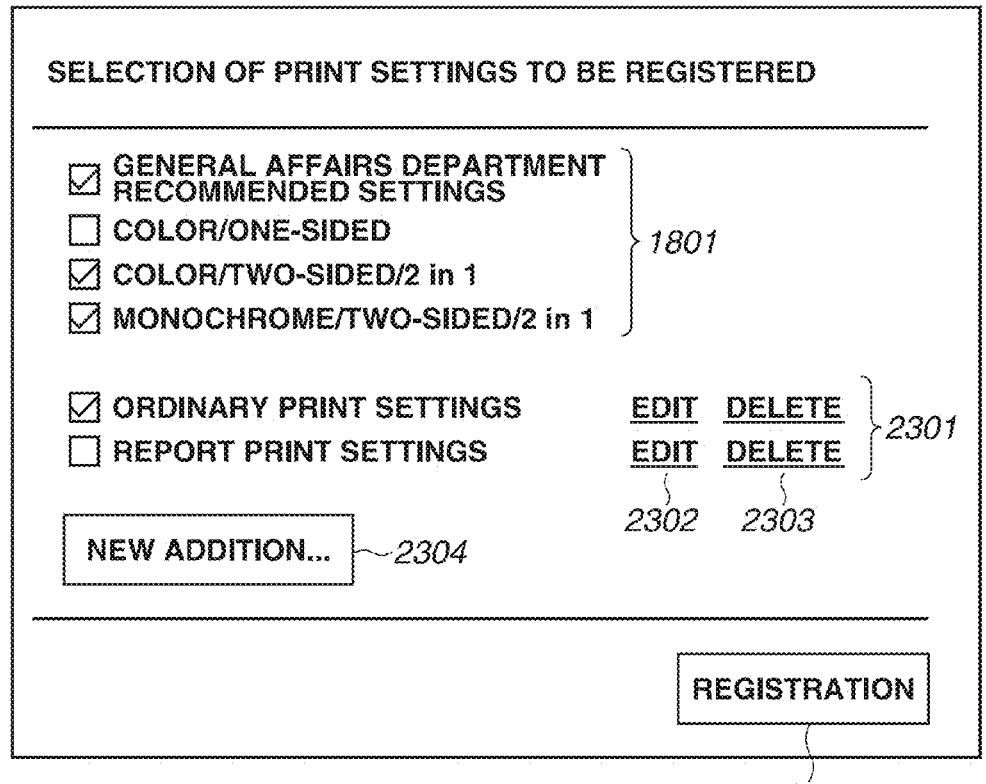

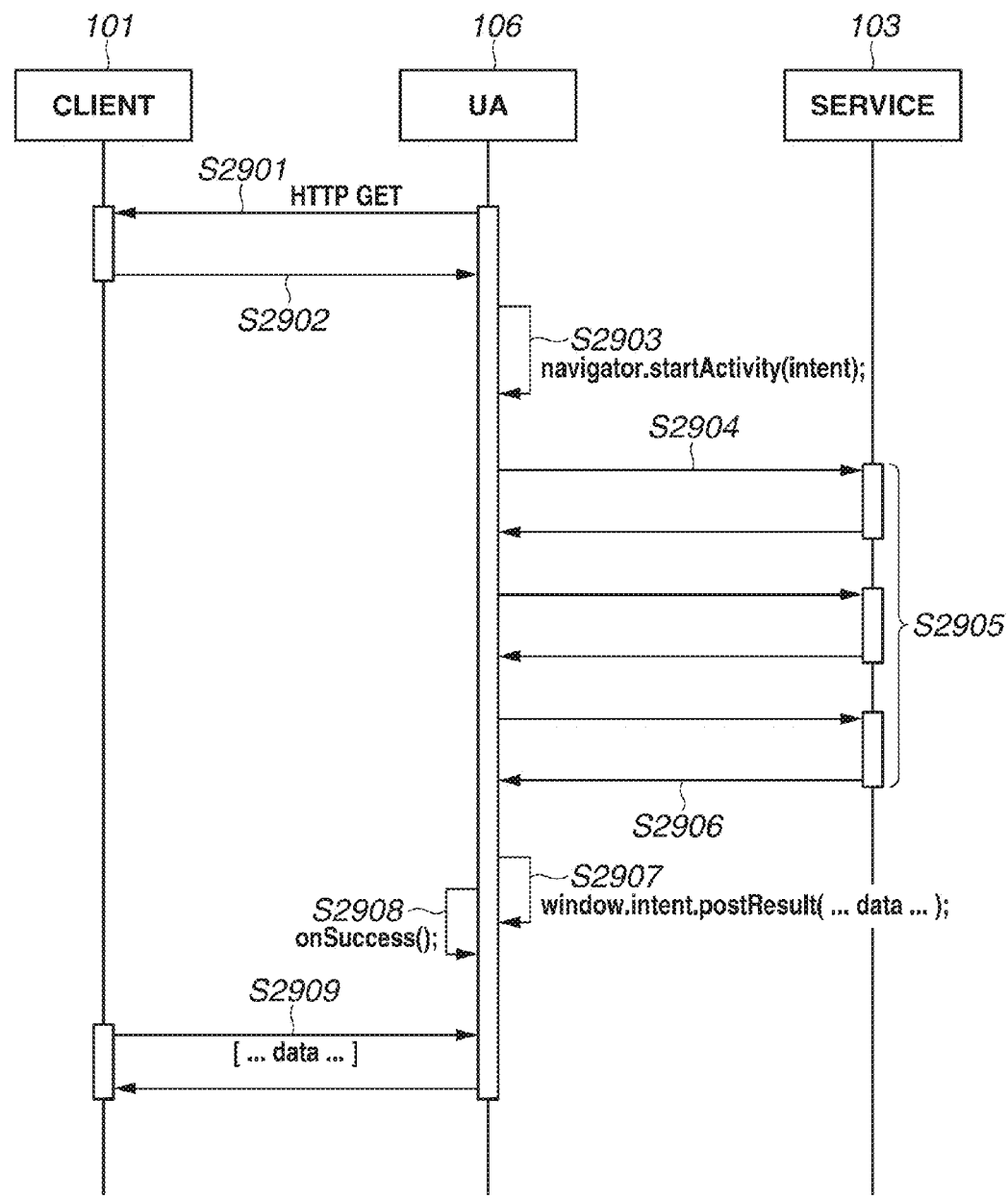

INFORMATION PROCESSING TERMINAL, PROCESSING APPARATUS, AND CONTROL METHOD

BACKGROUND OF THE INVENTION

Field of the Invention

The present invention relates to a technique for providing a service using a web service cooperation mechanism, such as Web Intents.

Description of the Related Art

Conventionally, in delegation of processing between websites, it was necessary for a function calling party to know a method for calling an application programming interface (API) or a representational state transfer (REST) interface of a function providing party. Accordingly, to cooperate with a different website, each function calling party is required to perform calling party processing according to calling protocols thereof. Further, in many cases, function calling parties are subjected to authentication when each function calling party uses a function provided by the function providing party. Therefore, it was necessary for each function using party to store authentication information about the function providing party or use an appropriate authentication infrastructure (e.g., SAML). However, in a case where authentication information is stored, it is necessary to manage the stored authentication information correctly and safely. On the other hand, in a case where the authentication infrastructure (e.g., SAML) is used, it is necessary to make agreements beforehand between a function provider and a user. Therefore, the burden of each function user increases considerably.

A mechanism capable of cooperating with an arbitrary web service (or a web application) without using any dedicated API is conventionally available. As an example, the mechanism generally referred to as Web Intents is already proposed to loosely couple a service receiving party with a service providing party by execution of a late binding and to realize the cooperation.

As discussed in Japanese Patent Application Laid-Open No. 2012-48457, it is conventionally known that a web browser can use a script (e.g., bookmarklet) to transmit information about a cooperation source website to a cooperation destination website. The cooperation destination website can acquire data from the cooperation source website with reference to the transmitted information.

In the above-mentioned Japanese Patent Application Laid-Open No. 2012-48457, a new cooperation mechanism (e.g., Web Intents) is not taken into consideration at all. In acquiring data from the cooperation source website, it is necessary for the cooperation destination website to get authentication information beforehand about the cooperation source website. Alternatively, the cooperation destination website requires an appropriate authentication cooperation mechanism (e.g., SAML). Accordingly, the cooperation destination website cannot provide any service to an arbitrary cooperation source.

According to the new cooperation mechanism (e.g., Web Intents), to use a providing function that can be provided by a service of the mechanism, a user agent (UA) processes an HTML document including a providing function registration markup. In accessing the service, the UA uses Web Intents corresponding to a function provided by a service registered therein and requests the service to execute the providing function. However, even in the Web Intents mechanism, in requesting a providing function, it is necessary for a user to perform various settings and edit service contents via the UA.

For example, if the providing function includes storage of data, it is necessary to select a data storage destination folder. If the providing function includes selection of images, it is necessary to designate a classification for each image selection. However, even in a case where the data storage destination folder is limited, it is necessary to select the same folder in each operation. Further, even in a case where the classification to be designated in image selection is limited, it is necessary to input the classification every time. User burden increases significantly.

Therefore, various improvements will be required to improve usability with respect to service request of the above-mentioned Web Intents or registration of Web Intents.

SUMMARY OF THE INVENTION

In view of the foregoing, the present invention intends to flexibly improve usability of the new cooperation mechanism (e.g., Web Intents) presently proposed.

According to an aspect of the present invention, an information processing terminal that has a relay function of causing a client that manages data to cooperate with a service that provides a function using the data managed by the client, via a network, includes a receiving unit configured to receive, from the service, information required to selectively register a plurality of pieces of function information corresponding to processing capable of being performed, based on different settings, using a function provided by the service, a registration unit configured to perform registration processing of the function information using the relay function, according to a selection based on the information received by the receiving unit, and a requesting unit configured to request the service, according to a designation of specific data and a selection of registered function information, to process the specific data based on settings corresponding to the selected function information.

Further features of the present invention will become apparent from the following description of exemplary embodiments with reference to the attached drawings.

BRIEF DESCRIPTION OF THE DRAWINGS

FIG. 2A is a block diagram illustrating a hardware configuration of an information processing terminal, and FIG. 2B is a block diagram illustrating a hardware configuration of an image forming apparatus.

FIGS. 4A and 4B illustrate an intents tag dedicated to function registration of the Web Intents and an ECMAScript dedicated to function registration of the Web Intents, respectively.

FIG. 5 is a sequence diagram illustrating a flow of WebIntent registration processing.

FIG. 6 illustrates an example of a print setting registration selection screen.

FIG. 7 illustrates an example of a WebIntent registration intent tag.

FIG. 8 is a sequence diagram illustrating a flow of Web Intents function calling processing.

FIG. 9 illustrates an example of a part of an HTML document that can be transmitted from a client to a UA.

FIG. 10 illustrates an example of a WebIntent selection screen.

FIG. 12A illustrates an example of a print setting display screen, and FIG. 12B illustrates an example of a display screen that can be displayed when a print operation is started.

FIG. 13 illustrates an example of a registrable print setting editing screen.

FIG. 14 illustrates an example of a print setting edit screen.

FIG. 15 illustrates an example of the print setting registration selection screen.

FIG. 16 illustrates an example of the WebIntent registration intent tag.

FIG. 17 is a flowchart illustrating an example of processing that can be performed by the service (e.g., the image forming apparatus) to transmit a response including a print setting HTML document.

FIG. 19A illustrates an example of a print setting registration selection screen according to a second exemplary embodiment, and FIG. 19B illustrates an example of the WebIntent registration intent tag according to the second exemplary embodiment.

FIG. 23 is a sequence diagram illustrating a flow of Web Intents function calling processing according to the third exemplary embodiment.

DESCRIPTION OF THE EMBODIMENTS

Various exemplary embodiments, features, and aspects of the invention will be described in detail below with reference to the drawings. Exemplary embodiments of the present invention are described in detail below with reference to attached drawings. Each of the embodiments of the present invention described below can be implemented solely or as a combination of a plurality of the embodiments or features thereof where necessary or where the combination of elements or features from individual embodiments in a single embodiment is beneficial.

Figure 1A:
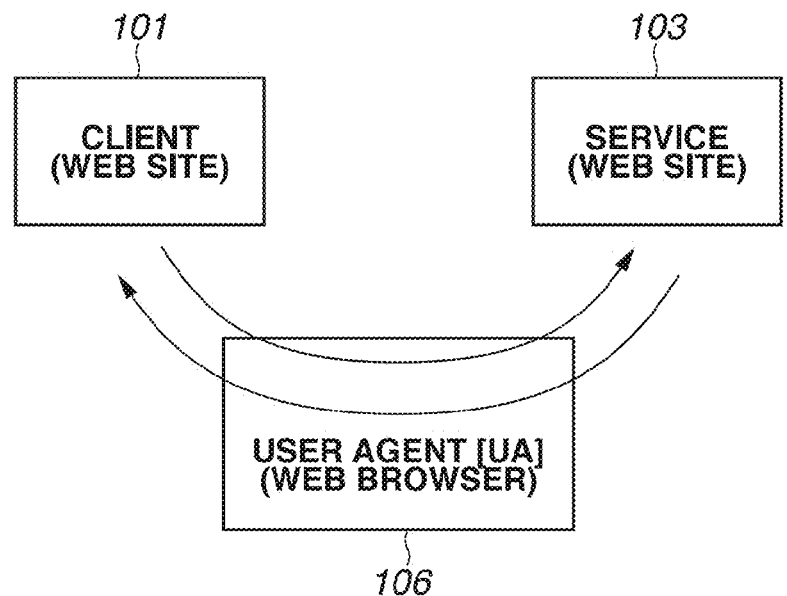
FIGS. 1A and 1B are block diagrams illustrating an example of Web Intents configuration.

FIG. 1A illustrates an example of Web Intents configuration, which is an example of a mechanism capable of cooperating with an arbitrary web service (or a web application) without using a dedicated API.

A Web Intents service (hereinafter referred to as "service") 103 can provide services and functions based on Intents techniques. A Web Intents client (hereinafter referred to as "client") 101 can use the service 103. A user agent (UA) 106 can receive a request from the client 101 and send the received request to the service 103. Further, the UA 106 can receive a result from the service 103 and send the received result to the client 101. The UA 106 can be regarded as having a relay function that enables the client 101 and the service 103 to transmit requests and receive/transmit data via a network (e.g., internet or intranet). Further, Web Intents (i.e., function information that can be referred to in calling the providing function of the service 103) are registered in the UA 106.

The client 101 that constitutes a part of the above-mentioned mechanism is, for example, a website that can manage data and includes a service calling button. The UA 106 is a web browser that can display the website. Further, the service 103 is a cooperation destination of the client 101. More specifically, the service 103 is another website that can receive the data managed by the client 101 via the UA 106 and process the received data.

For example, in a case where the above-mentioned mechanism is applied to a social networking service (SNS), the service 103 is a contribution distribution service that accepts a contribution including a photo or a comment managed by a client and constitutes a browsing site. For example, in a Web Intents mechanism, the client 101 serves as a site that includes social buttons, such as "sounds good", "check", and "share", of an SNS site, and the UA 106 serves as the web browser. Further, the service 103 is a contribution distribution service, such as "sounds good". In a case where user authentication or user operation is required when the service 103 provides a function, a user performs a required operation on the UA 106.

The UA 106 is not limited to the above-mentioned web browser and can be realized by an operating system (OS) or an application that operates on an information processing terminal if it is capable of cooperating with a service described below. In the present exemplary embodiment, an example of the information processing terminal is a personal computer, a smart phone, a tablet, or a car navigation system.

Further, the service provider is not limited to a service provider accessible via the internet, such as the above-mentioned contribution distribution service. For example, a built-in device (e.g., a camera, a printer, or a scanner) of the information processing terminal can be a service provider of the service 103. Further, peripheral devices (e.g., a printer, a scanner, and a network camera) accessible via the network and consumer electronics (e.g., a refrigerator and a television receiver) can be service providers of the service 103. The client 101, the UA 106, and the service 103 can be combined arbitrarily to work in the same system. Further, any one of the client 101, the UA 106, and the service 103 may be functionally operable in the same apparatus.

Figure 3:
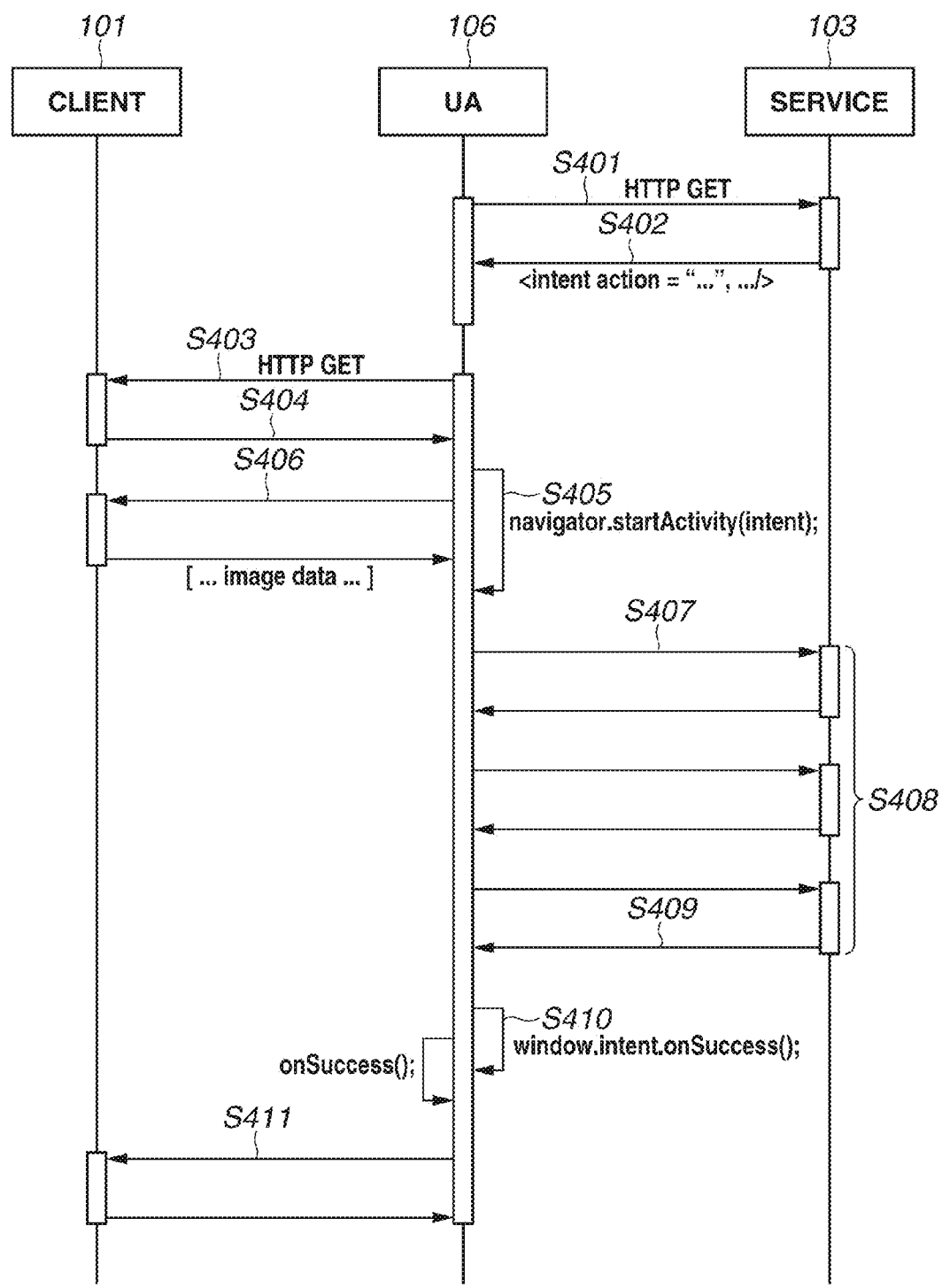
FIG. 3 is a sequence diagram illustrating a basic operation relating to the Web Intents.

FIG. 3 is a sequence diagram illustrating a basic operation relating to a service providing using the Web Intents.

In step S401, the UA 106 accesses the service 103 according to a user operation. In step S402, the service 103 transmits an HTML response including a registration markup that causes the UA 106 to register a service of the service 103 to the UA 106.

FIG. 4A illustrates an example of an HTML document transmitted from the service 103 to the UA 106 in step S402. Detailed contents of the HTML document transmitted from the service 103 to the UA 106 will be described below with reference to the example illustrated in FIG. 4A.

In FIG. 4A, an <intent> tag includes information about "action", "type", "href", "title", and "disposition" as descriptions relating to service identifying information. The description "action" indicates category of the providing function. More specifically, the description "action" indicates "function" and "service" that can be provided by the providing function. The category of the providing function is, for example, a data sharing category "Share", a data editing category "Edit", a data browsing category "View", a data acquiring category "Pick", or a data storing category "Save".

The description "type" indicates data type that can be processed by the providing function. More specifically, the description "type" indicates data type that can be processed by the above-mentioned "action". The description "href" indicates connection destination (URL) of the providing function. The description "title" indicates title of the providing function. Further, the description "disposition" indicates display pattern of the called providing function.

According to the example illustrated in FIG. 4A, the category of the providing function is "share" and the data type that can be processed is "image data of every format (*)", and the connection destination is "share.html". Further, the title is "Share image using e-mail". Further, it is indicated that the above-mentioned functions can be displayed in another window via the UA.

If the UA 106 receives the HTML response transmitted in the above-mentioned step S402, the UA 106 confirms whether the user intends to register the providing function of the service 103 in the UA 106. For example, if the UA 106 is the web browser, the UA 106 displays a pop-up window and prompts the user to determine the necessity of the above-mentioned registration. If the user instructs registering the above-mentioned providing function as Web Intent, the UA 106 stores the information received in the above-mentioned step S402 in an internal storage device thereof. More specifically, the information received in the above-mentioned step S402 is stored in a storage area of the information processing terminal, in which the UA 106 is operating, and registered as Web Intents in the UA 106.

In step S403, the UA 106 accesses the client 101 according to a user operation. In step S404, the client 101 transmits a response including an HTML document describing the usage of the providing function (Web Intent) of the service 103 to the UA 106. For example, if the client 101 is a website capable of displaying an image and a "share" button, the website transmits an HTML document including an ECMAScript illustrated in FIG. 4B to the UA 106.

FIG. 4B illustrates an example of the HTML document transmitted from the client 101 to the UA 106 in step S404. Detailed contents of the HTML document transmitted from the client 101 to the UA 106 will be described in detail below with reference to the example illustrated in FIG. 4B.

The ECMAScript indicates executing a designated anonymous function if a button having "share-photo" ID information in the HTML is clicked. First, the anonymous function generates a new Intent object and then calls a startActivity( ) function using the generated Intent object as an argument. If the UA 106 executes the above-mentioned function, the UA 106 extracts each one of Web Intents registered therein, if it coincides with the designated Intent object in both "action" and "type" and displays a list of extracted Web Intents to request the user to select a desired one. Further, the UA 106 acquires image data stored in the client 101 by executing a getImageFrom( ) function called in the anonymous function.

In step S404, the UA 106 receives an HTML document transmitted from the client 101 and displays a screen based on the received HTML document. In step S405, if the UA 106 detects a user's pressing of the "share" button on the screen, the UA 106 executes a Web Intents launching ECMAScript as mentioned above. Then, in step S406, the UA 106 acquires image data from the client 101. Further, if the pressing of the "share" button has been detected in step S405, the UA 106 displays a list of Web Intents data registered therein. If the UA 106 detects that the user has selected a WebIntent indicating a providing function of the service 103 from the above-mentioned list, then in step S407, the UA 106 transmits an HTTP request to the selected service 103. In this case, the transmission data to be transmitted by the UA 106 includes the content of the Intent object generated by the ECMAScript illustrated in FIG. 4B.

In step S408, the service 103 extracts the Intent object from the HTTP request received from the UA 106 and realizes the usage of the selected providing function ("share" of the image data acquired from the client 101 in the present exemplary embodiment) while interacting with the user via the UA 106.

If the service 103 completes the above-mentioned providing function related processing, then in step S409, the service 103 transmits a response including an ECMAScript that informs the client 101 of a processing result to the UA 106. In step S410, the UA 106 executes the ECMAScript included in the response and calls a callback function onSuccess( ) designated by the argument of the startActivity( ) function in the above-mentioned step S405. In step S411, the UA 106 transmits a processing result to the client 101 using the callback function onSuccess( ).

Hereinbelow, an example using a web mail function according to the sequence illustrated in FIG. 3 is described below. First, if a user of the web browser (the UA 106) accesses a site of a photo data managing web storage (the client 101), in which a Web Intents calling button is prepared, and presses the Web Intents calling button, the web browser (i.e., the UA 106) displays a pop-up window that includes a registration service list. If the service selected by the user is the web mail function on the pop-up window, a site that provides the selected function can be displayed in another window, as a processing result. The user can generate a new mail including attached photo data in the displayed window.

Through the above-mentioned processing, the client 101 can call an intended Web Intents function (e.g., "share" of an image according to the above-mentioned example) provided by the service 103 via the UA 106.

Figure 1B:
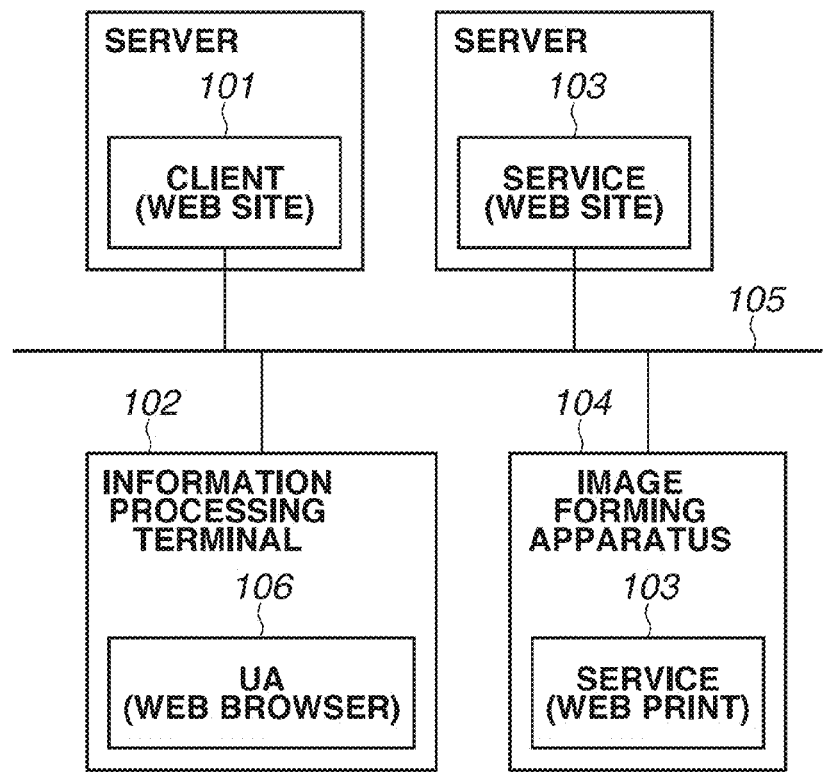

FIG. 1B illustrates an entire configuration of the Web Intents service according to the present invention.

As illustrated in FIG. 1B, an information processing terminal 102 includes a web browser that can function as the user agent (UA) 106 of the Web Intents. Further, apparatuses connected to the information processing terminal 102 via a network 105 include an image forming apparatus 104 that can function as the service 103 of the Web Intents and servers each providing a website. The image forming apparatus 104 is, for example, a digital multifunction peripheral having a print function and a scan function, a general printer, a scanner, or a digital camera. Further, the image forming apparatus 104 has the capability of operating as a web server. The information processing terminal 102, the image forming apparatus 104, and each server can communicate with each other via the network 105. Further, the network 105 may be a local area network (LAN), the internet, or a combination thereof. Further, the network 105 may be configured as a wired type or a wireless type.

The UA 106 that can be realized by the web browser has functions of a registration unit configured to perform Intent registration related processing, a management unit configured to manage each registered Intent, and a display control unit configured to provide a screen that enables a user to input an instruction relating to Intent registration and execution. Further, the UA 106 can relay data and processing results between the client and each service, using predetermined protocols (e.g., HTTP).

More specifically, the UA 106 performs Intent registration, via a user operation, by accessing the service 103 (e.g., the image forming apparatus 104). Further, the UA 106 receives a WebIntent service execution request by accessing the website (i.e., the client 101), and is connected to the service 103 (e.g., the image forming apparatus 104) with reference to registered information according to a user selection. Further, the UA 106 receives a completion notification relating to the WebIntent processing from the service 103 and notifies the client 101 of a processing result.

In the present exemplary embodiment, the image forming apparatus 104 provides, as the service 103, a web print function that performs print settings and print processing on document data requested by the client 101, using a GUI of the UA 106 that is functionally operable as the web browser. The category designation for the above-mentioned function can be realized by designating "Print" in the "action" of Intent, in an exemplary embodiment described below. The above-mentioned definition is the one provisionally given for the purpose of simplifying the description of the exemplary embodiment. Where the category designation for the print function provided by the image forming apparatus 104 is described, the present invention is applicable to any case where the category designation is something other than print (e.g., "share" or "view" is designated in the "action").

FIG. 2A is a block diagram illustrating an example of a hardware configuration of the information processing terminal that can execute programs (including web browser, OS, and applications) in such a way as to realize various functions of the UA 102. A similar hardware configuration can be applied to each server which is operable as the client 101 or the service 103 by executing a program (e.g., a website).

As illustrated in FIG. 2A, the information processing terminal 201 includes a central processing unit (CPU) 202, a random access memory (RAM) 203, a read only memory (ROM) 204, and an external storage device 209. The CPU 202 can perform overall processing for controlling respective devices connected to the system bus 211 by executing programs stored in the ROM 204 or in the external storage device 209 or programs download via the network 105 (e.g., LAN). The RAM 203 can function as a main memory or a work area for the CPU 202. The external storage device 209 is, for example, a hard disk (HD) or a floppy (registered trademark) disk (FD). The external storage device 209 stores a boot program, an operating system, various applications including an authentication server and an authentication client, database data, and user files. Further, the information processing terminal includes a keyboard controller (KBDC) 206, a video controller (VC) 208, and a disk controller (DKC) 210. The KBDC 206 can transmit input information, if the information is acquired via a keyboard (KBD) 205 or a pointing device (not illustrated), to the CPU 202. The VC 208 can control a display device 207, such as a cathode ray tube (CRT) or a liquid crystal display (LCD), to perform a display operation appropriately. The DKC 210 can control each access to the external storage device 209. The information processing terminal is connected to the network 105 via a communication controller (COMM I/F) 212. The CPU 202 of the information processing terminal is functionally operable as the UA 102, the client 101, and the service 103. To this end, the CPU 202 reads and executes programs stored in the external storage device 209 in such a way as to realize processing to be performed in each of the UA 102, the client 101, and the service 103 of the server.

FIG. 2B is a block diagram illustrating a configuration of the image forming apparatus 104.

In FIG. 2B, a CPU 301 can perform overall processing for controlling respective devices connected to a system bus 306 by executing software programs stored in a ROM 302 or a hard disk (HDD) 305 to perform an overall control for the image forming apparatus. The image forming apparatus 104 includes a RAM 303, a hard disk controller (HDC) 304, a reader I/F 307, a printer I/F 308, an operation unit I/F 309, and a network interface card (NIC) 314. The RAM 303 can function as a work area for the CPU 301. The HDC 304 can control the HDD 305. The reader I/F 307 and the printer I/F 308 are connected to a reader unit 311 and a printer unit 312 to control these devices. The operation unit I/F 309 is connected to an operation unit 313 to control a display operation to be performed by the operation unit 313 and to receive a user input via the operation unit 313. The operation unit 313 includes various switches and a display unit to allow a user to perform operations appropriately. The network I/F (NIC) 314 can transmit and receive data to and from an external apparatus via the network 105. In FIG. 2B, a portion surrounded by a dotted line is referred to as an overall control unit 310. The overall control unit 310 can control various apparatuses and interfaces connected to the image forming apparatus 104 and can control all operations to be performed by the image forming apparatus 104. The reader unit 311 can read an image of a document and can output image data corresponding to the document image to the printer unit 312 according to a user instruction or store the image data in an appropriate built-in storage device of the image forming apparatus. Further, the reader unit 311 can transmit the above-mentioned image data to an external apparatus connected to the network 105 via the network I/F 314. The printer unit 312 can print a document read by the reader unit 311 and can print image data stored in a built-in storage device (e.g., the HDD 305) of the image forming apparatus 104. Further, the printer unit 312 can receive a print job from an external apparatus connected to the network 105 via the network I/F unit 314 and can perform print processing based on the received print job. The operation unit 313 can display information to be forwarded from the overall control unit 310 to a user and can transmit an instruction input by a user to the overall control unit 310, by means of buttons and a display unit, or a touch panel equipped liquid crystal display screen, or a combination thereof.

Further, the overall control unit 310 can communicate with another information device accessible via the network 105 via the network I/F unit 314 to provide and control web services (including the web print function). In this respect, the hardware configuration of the image forming apparatus 104 can be modified in such a way as to include additional CPU that can provide web services. Further, to realize the processing of the service 103 in the image forming apparatus 104, the CPU 301 of the image forming apparatus 104 reads and executes programs loaded from the ROM 302 or the HDD 305.

Intent registration processing according to the WebIntent mechanism is described in detail below with reference to FIGS. 5 to 7.

FIG. 5 is a sequence diagram illustrating registration of Intent corresponding to the service 103 that the image forming apparatus 104 provides to the UA 106.

In step S701, the UA 106 transmits an HTTP request to a web print function website of the image forming apparatus 104 according to a user operation. In step S702, the service 103 of the image forming apparatus 104 transmits an HTML response to the UA 106. The HTML response to be transmitted in this step is an HTML document including a WebIntent registration markup (i.e., an intent tag) corresponding to the HTTP request. If the UA 106 receives the HTML response from the service 103 of the image forming apparatus 104, then in step S703, the UA 106 displays a screen illustrated in FIG. 6 based on the received HTML response.

FIG. 6 illustrates an example of a screen that can be displayed on the UA 106 (i.e., the web browser) based on the HTML response received from the service 103 of the image forming apparatus 104 in step S702.

The screen illustrated in FIG. 6 includes a selectable print setting list 801. A user selects print settings to be registered in the UA 106 from the print setting list 801 and presses a "registration" button 802. If the UA 106 detects a pressing of the "registration" button 802, then in step S704, the UA 106 transmits an HTML request to the service 103 of the image forming apparatus 104. The HTML request to be transmitted in this step includes the state of user selection on the print setting list 801. The plurality of pieces of selectable function information displayed in the list 801 belongs to the same category. The example illustrated in FIG. 6 is "share" or "view" corresponding to the print function category.

In step S705, the service 103 of the image forming apparatus 104 transmits an HTML response to the UA 106. The HTML response to be transmitted in this step includes a WebIntent registration Intent tag to perform printing based on the selected print settings.

FIG. 7 illustrates an example of the WebIntent registration intent tag included in the HTML response transmitted from the service 103 of the image forming apparatus 104 in the above-mentioned step S705. The example illustrated in FIG. 7 is based on the assumption that the user has selected "color/one-sided", "color/two-sided/2 in 1", and "monochrome/two-sided/2 in 1" on the screen illustrated in FIG. 6.

In FIG. 7, an intent tag 901 designates "print" as a category of the providing function and further designates "pdf (Portable Document Format)" as a data type that can be processed by the providing function. Further, "href" of the intent tag 901 indicates that the providing function can be started in response to transmission of an HTTP request corresponding to the page "print.html?id=p001" by the image forming apparatus 104.

If the UA 106 receives the HTML document including the WebIntent registration markup illustrated in FIG. 7, then in step S706, the UA 106 displays a dialog that allows the user to confirm the necessity of registration in a case where the same Intent is not yet registered in the UA 106. Then, if the UA 106 detects a registration instruction from the user via the above-mentioned dialog, the UA 106 registers information included in the above-mentioned registration markup in an internal storage device.

As mentioned above, first in step S701, the UA 106 transmits the HTML request to the service 103. Then, in step S702, the service 103 transmits the HTML response (e.g., the screen illustrated in FIG. 6) to the UA 106 based on the received HTML request. Further, in step S703, the UA 106 displays the above-mentioned screen to accept a user selection. Then, in step S704, the UA 106 transmits the HTML request including the selection state on the screen illustrated in FIG. 6 to the service 103. Subsequently, in step S705, the service 103 transmits the HTML response including the WebIntent registration Intent tag (e.g., FIG. 7) to perform printing based on the selected print settings to the UA 106.

In step S706, the UA 106 registers the information included in the above-mentioned Intent tag in the internal storage device thereof. However, the service 103 may be configured to transmit an HTML response including, for example, information required to display the screen illustrated in FIG. 6 and the WebIntent registration Intent tag (see the tag illustrated in FIG. 7) of each print setting selectable on the screen illustrated in FIG. 6, to the UA 106, in response to the HTML request transmitted from the UA 106 in step S701. Further, the UA 106 may be configured to display the above-mentioned screen to accept a user selection. Further, the UA 106 may be configured to register the information (already received together with the screen illustrated in FIG. 6) included in the WebIntent registration Intent tag required to perform printing based on the selected print settings in the UA 106. More specifically, the service 103 may be configured to transmit a screen that is usable to select function information to be registered in the UA 106, which is a part of the function information (e.g., print function information including print settings) provided by the service 103 and all of information required to register the function information selectable on the screen, to the UA 106, in response to the HTML request in step S702. Further, the UA 106 may be configured to acquire user selected function information from the above-mentioned already received information and register the acquired information in an appropriate storage device therein.

Next, a Web Intents function calling sequence in which the Web Intents function calling from the client 101 is processed by the service 103 via the UA 106 is described.

FIG. 8 is a sequence diagram illustrating the sequence in which the Web Intents function calling from the client 101 is processed by the service 103 via the UA 106. In the sequence illustrated in FIG. 8, the service 103 is the image forming apparatus 104.

In step S1001, the UA 106 transmits an HTTP request to the client 101 according to a user instruction. In step S1002, the client 101 transmits a response including an HTML document corresponding to the HTTP request of the UA 106.

FIG. 9 illustrates a part of the HTML document included in the response transmitted from the client 101 to the UA 106 in step S1002.

In FIG. 9, a getDocFrom( ) function 1101 is an ECMAScript function (although internal processing of the function is not illustrated) that can acquire document data from a designated address. A printUsingWI( ) function 1102 can instruct the UA 106 to perform Web Intents print category Intent calling to print the document data acquired by the getDocFrom( ) function 1101. An HTML element 1103 can display a link to the document and a button operable to launch the printUsingWI( ) function 1102 on the UA 106, to print the document using the Web Intents mechanism.

Referring back to the flowchart illustrated in FIG. 8, in step S1003, if the UA 106 detects a pressing of a button corresponding to the HTML element 1103 by a user via the display screen, the UA 106 executes the printUsingWI( ) function 1102. This function calls the getDocFrom( ) function 1101. In step S1004, the UA 106 acquires the designated document data from the client 101 (i.e., the website) in response to the function execution in step S1003.

Next, the UA 106 generates an Intent object with reference to document data acquired by the printUsingWI( ) function 1102 and calls a navigator.startActivity( ) function using the generated object as an argument. In response to the above-mentioned calling, the UA 106 displays a list of registered Intents that can process the above-mentioned Intent object, to allow the user to select appropriate processing. The list display in the present exemplary embodiment is performed according to designation contents of "action" and "type".

FIG. 10 illustrates an example of an Intent object processible Intent selection screen that is displayed by the UA 106 through the function execution in step S1003. Intent title values having been already registered are displayed in the list illustrated in FIG. 10. However, any other appropriate values are usable as identification information to be displayed. The user selects a desired printing option from the above-mentioned list. It is now presumed that the option selected by the user is "perform color/two-sided/2 in 1 printing (iR-AD C5035)" registered in step S706 illustrated in FIG. 5.

In step S1005, in response to the selection of WebIntent by the user via the selection screen (see FIG. 10), the UA 106 transmits an HTTP request including the Intent object transmitted according to the startActivity( ) argument to the image forming apparatus 104 (i.e., the service 103).

If the image forming apparatus 104 receives the HTTP request including the Intent object, then in step S1006, the image forming apparatus 104 transmits a response including an HTML document required to display a screen usable to perform print settings to the UA 106. Subsequently, in step S1006, the UA 106 performs print settings for document data included in the Intent object according to a user operation, while communicating with the image forming apparatus 104.

Figure 11:
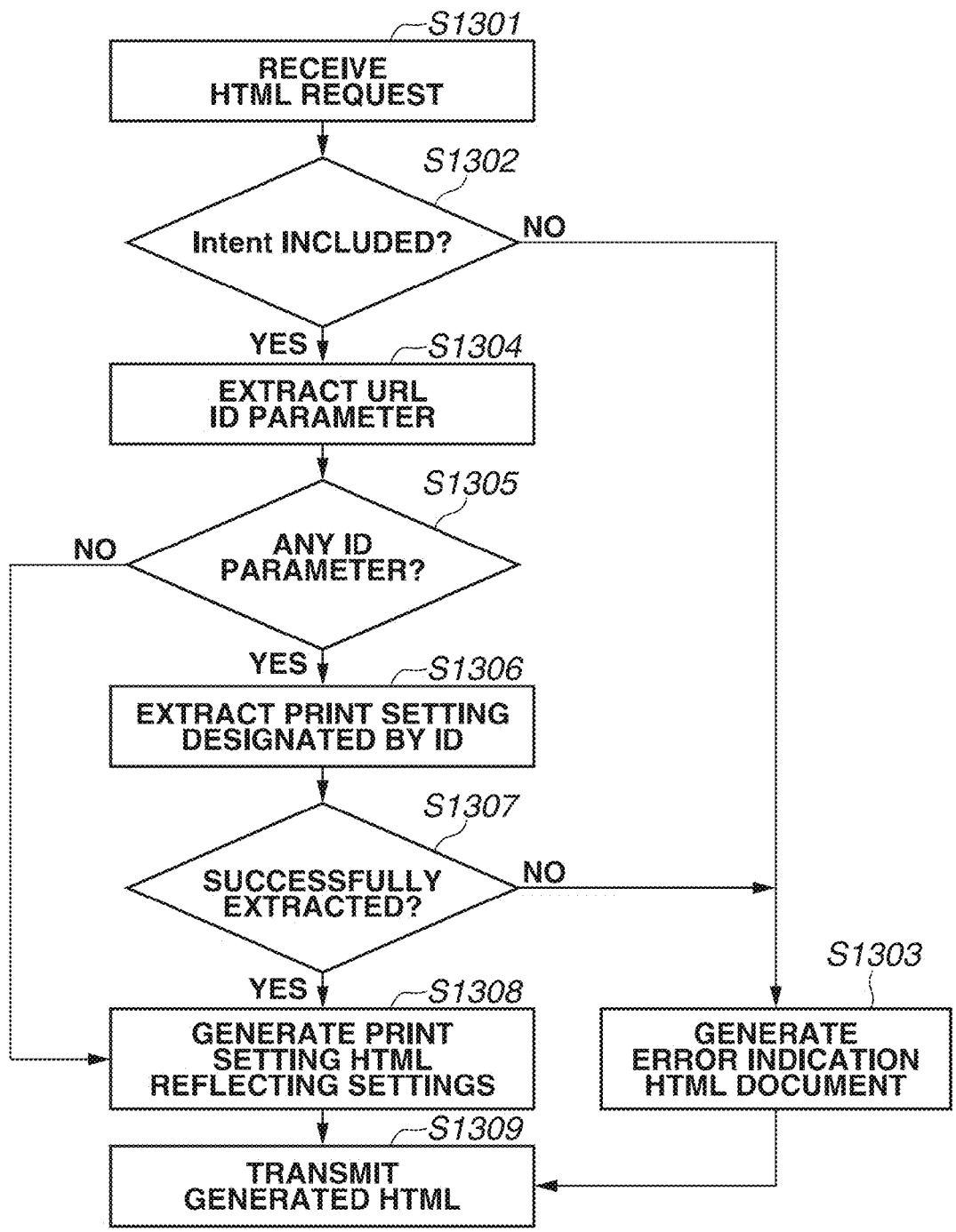
FIG. 11 is a flowchart illustrating an example of processing that can be performed by a service (e.g., the image forming apparatus) to transmit a response including a print setting HTML document.

FIG. 11 is a flowchart illustrating the processing that the image forming apparatus 104 (serving as the service 103) performs in step S1006 in response to the reception of the HTTP request in step S1005. To realize the processing in each step of the above-mentioned flowchart, the CPU 301 of the image forming apparatus 104 reads and executes a control program according to the present invention stored in a nonvolatile storage device (e.g., the ROM 302 or the HDD 305).

In step S1301, the image forming apparatus 104 receives the HTTP request from the UA 106. In step S1302, the image forming apparatus 104 determines whether the HTTP request received in the above-mentioned step S1301 includes the Intent object. If the image forming apparatus 104 determines that the Intent object is not included (No in step S1302), the operation proceeds to step S1303.

In step S1303, the image forming apparatus 104 generates an error indication HTML document to display an invalid request notification on the UA 106. In step S1309, the image forming apparatus 104 transmits the error indication HTML document (i.e., the document generated in the above-mentioned step S1303) to the UA 106.

On the other hand, if the image forming apparatus 104 determines that the HTTP request includes the Intent object (Yes in step S1302), the operation proceeds to step S1304. In step S1304, the image forming apparatus 104 extracts a URI ID parameter of the HTTP request. In the present exemplary embodiment, the URI ID parameter is an assembly of character string in the form of "key=value".

Next, in step S1305, the image forming apparatus 104 determines whether the URI ID parameter is present. To this end, the image forming apparatus 104 determines whether the extraction of the URI ID parameter has been successfully completed in the above-mentioned step S1304. Then, if the image forming apparatus 104 determines that the extraction of the URI ID parameter has been failed, more specifically, the URI ID parameter is not present (No in step S1305), the operation proceeds to step S1308. In this case, in step S1308, the image forming apparatus 104 generates a print setting HTML document that reflects default print settings. Then, in step S1309, the image forming apparatus 104 transmits a response including the HTML document generated in the above-mentioned step S1308 to the UA 106.

On the other hand, if the image forming apparatus 104 determines that the extraction of the URI ID parameter has been successfully completed in the above-mentioned step S1305, more specifically, the URI ID parameter is present (Yes in step S1305), the operation proceeds to step S1306. In step S1306, the image forming apparatus 104 extracts print settings according to the content of the URI ID parameter extracted in the above-mentioned step S1304.

Next, in step S1307, the image forming apparatus 104 determines whether the extraction of print settings corresponding to the ID parameter has been successfully completed in the above-mentioned step S1306. Then, if the image forming apparatus 104 determines that the extraction of print settings corresponding to the ID parameter has been failed (No in step S1307), then in step S1303, the image forming apparatus 104 generates the error indication HTML document. In step S1309, the image forming apparatus 104 transmits the error indication HTML document to the UA 106.

On the other hand, if the image forming apparatus 104 determines that the extraction of print settings corresponding to the ID parameter has been successfully completed in the above-mentioned step S1307 (Yes in step S1307), the operation proceeds to step S1308. In this case, in step S1308, the image forming apparatus 104 generates a print setting HTML document that reflects the print settings corresponding to the ID parameter having been extracted in the above-mentioned step S1306. For example, in a case where the ID is "P004", the image forming apparatus 104 generates a print setting HTML document reflecting "color", "two-sided", and "2 in 1 (printing two pages on a single page)" settings. Subsequently, in step S1309, the image forming apparatus 104 transmits a response including the HTML document generated in the above-mentioned step S1308 to the UA 106.

FIG. 12A illustrates an example of a setting screen that is displayed on the UA 106 (i.e., the web browser) based on the print setting HTML document transmitted from the image forming apparatus 104 to the UA 106 in step S1309 (i.e., step S1006 in FIG. 8). The processing to be performed in step S1006 in FIG. 8 includes transmission of the HTML document from the image forming apparatus 104 to display the print setting screen illustrated in FIG. 12A (see step S1309 illustrated in FIG. 11), transmission of the HTTP request from the UA 106 according to an operation on the print setting screen illustrated in FIG. 12A, and transmission of the HTML document from the image forming apparatus 104.

The user performs print settings in an intended manner by operating various print setting controls 1401 on the print setting screen illustrated in FIG. 12A. Then, the user clicks a "print" button 1402 provided at a lower right end of the setting screen to instruct printing of document data (Intent object).

Now referring back to FIG. 8, if the UA 106 detects the user's click operation on the "print" button 1402 of the screen illustrated in the FIG. 12A, then in step S1007, the UA 106 transmits an HTTP request indicating that the "print" button 1402 has been clicked, together with the setting contents illustrated in FIG. 12A, to the image forming apparatus 104. If the image forming apparatus 104 receives the above-mentioned HTTP request, the image forming apparatus 104 starts printing the document data (pdf) received in step S1005 according to the print settings designated in the HTTP request. Further, in step S1008, the image forming apparatus 104 transmits an HTML document to display a notification that the printing of the document (pdf) has been started on the UA 106, as a response corresponding to the request in step S1007, to the UA 106. In step S1009, the UA 106 receives the HTML document transmitted from the image forming apparatus 104 in the above-mentioned step S1008 and performs a display operation based on the received HTML document.

FIG. 12B illustrates an example of a display performed on the UA 106 (i.e., the web browser) based on the HTML document received from the image forming apparatus 104 in step S1008.

If the UA 106 detects that an "OK" button 1501 has been clicked on the screen illustrated in FIG. 12B, the UA 106 closes the window of the UA 106 that displays the above-mentioned screen.

In the present exemplary embodiment, the image forming apparatus 104 has a web page usable to change and manage device settings. Hereinbelow, the above-mentioned device setting changing and managing function is described in detail below.

FIG. 13 illustrates an example of a screen that is displayed on the UA 106 based on a print setting HTML document transmitted from the image forming apparatus 104 in a case of accessing as an administrator to the web server of the image forming apparatus 104.

The screen illustrated in FIG. 13 includes a list of print settings 1601 having been set beforehand in the image forming apparatus 104 and a list of print settings 1602 added using the above-mentioned HTML screen. The screen illustrated in FIG. 13 further includes a screen opening link 1603 operable to edit the added print settings and another link 1604 operable to delete the added print settings.

A button 1605 is operable to open a screen to newly add print settings. Respective check boxes 1606 and 1607 enable the user to select desired print settings from the displayed print setting list, as print settings to be displayed on the print setting registration screen. A save button 1608 is operable to store the print settings to be registered. The image forming apparatus 104 stores a list of print settings having been checked using the check boxes 1606 and 1607 in response to the pressing of the save button 1608 in an appropriate built-in storage device (e.g., the HDD 305) of the image forming apparatus 104. The plurality of pieces of selectable function information displayed in the list illustrated in FIG. 13 belongs to the same category ("share" or "view" corresponding to the print function category according to the example illustrated in FIG. 13).

FIG. 14 illustrates an example of a print setting edit and addition screen that is displayed on the UA 106 when the "editing" link 1603 or the "new addition" button 1605 illustrated in FIG. 13 is pressed.

The screen illustrated in FIG. 14 includes the name of print settings 1701 to be used in registration which is unchangeable in editing existing settings (i.e., when the "editing" link 1603 is operated to display the screen). The screen illustrated in FIG. 14 further includes various controls 1702 for changing the print settings. If the image forming apparatus 104 detects a pressing of a "save" button 1703 via the UA 106, the image forming apparatus 104 stores the print setting name designated by the registration name 1701 and the print settings designated by the controls 1702, as registrable print settings, in a built-in storage device (e.g., the HDD 305) of the image forming apparatus 104. In storing the registrable print settings, the image forming apparatus 104 allocates unique identifiers (IDs) to respective print settings together with a revision number usable to manage the change occurring in each "editing" operation.

As mentioned above, a processing apparatus (e.g., the image forming apparatus 104) that can function as the service 103 stores and manages a plurality of editable pieces of function information (e.g., print function information including print settings) that can be selectively registered in the UA 106. Further, the above-mentioned processing apparatus allocates revision numbers to the above-mentioned plurality of pieces of registrable function information to manage every change occurring in each editing operation. The above-mentioned processing apparatus can transmit a screen (see FIG. 13) that is operable to register the above-mentioned plurality of pieces of function information beforehand in the service 103 to the UA 106. Further, the processing apparatus can register optional function information, in the service 103, based on an operational input via the screen displayed on the UA 106. The registered optional function information is referable in registering the function information in the UA 106.

FIG. 15 illustrates an example of a print setting registration selection screen (which corresponds to FIG. 6) that can be displayed on the UA 106 when the "save" button 1608 is pressed in the state illustrated in FIG. 13.

The screen illustrated in FIG. 15 includes a list of registration candidate print settings 1801, which are print settings selected using the check boxes 1606 and 1607 illustrated in FIG. 13. If the UA 106 detects a pressing of a "registration" button 1802, the UA 106 transmits an HTML request including information about the print settings being selected using check boxes of the list 1801 to the image forming apparatus 104 (which corresponds to step S704 illustrated in FIG. 5). In response to the above-mentioned HTML request, the image forming apparatus 104 transmits an HTML response including a WebIntent registration Intent tag to perform printing based on print settings selected using the check boxes to the UA 106 (which corresponds to step S705 illustrated in FIG. 5). The plurality of pieces of selectable function information displayed in the list 1801 belongs to the same category ("share" or "view" corresponding to the print function category according to the example illustrated in FIG. 15).

FIG. 16 illustrates an example of the WebIntent registration intent tag included in the HTML document that the image forming apparatus 104 transmits to the UA 106 in step S705 illustrated in FIG. 5 in response to the HTML request responding to the pressing of the "registration" button illustrated in FIG. 15.

In FIG. 16, an intent tag 1901 corresponds to the print settings added on the screens illustrated in FIGS. 13 and 14. URL parameter "id" of "href" is constituted by "c" indicating the added print settings and an identifier identifying the added print settings. Further, URL parameter "rev" is the revision number of the added print settings. According to the example illustrated in FIG. 16, the ID of the added print settings is "c0b0a09f90" and the revision number of the added print settings is "cbb2fff04".

As described with reference to FIGS. 15 and 16, the service 103 transmits the HTML response (e.g., the screen illustrated in FIG. 15) to the UA 106 based on the HTML request transmitted from the UA 106 in response to the pressing of the "save" button 1608 illustrated in FIG. 13. The UA 106 displays the above-mentioned screen and accepts a user selection. Then, the UA 106 transmits the HTML request including the selection state of the screen illustrated in FIG. 15 to the service 103. The service 103 transmits the HTML response including the WebIntent registration Intent tag (e.g., FIG. 16) for performing printing based on the selected print settings to the UA 106. The UA 106 registers the information included in the above-mentioned Intent tag in an internal storage device of the UA 106. However, the service 103 can be configured to transmit an HTML response including the information required to display the screen illustrated in FIG. 15 and the WebIntent registration Intent tag (i.e., the tag illustrated in FIG. 16) of respective print settings selectable on the screen illustrated in FIG. 15 to the UA 106 based on the HTML request transmitted from the UA 106 in response to the pressing of the "save" button 1608 illustrated in FIG. 13. The UA 106 can be configured to display the above-mentioned screen to accept a user selection and register the information (received together with the screen illustrated in FIG. 15) included in the WebIntent registration Intent tag for performing printing based on the selected print settings in an appropriate storage device of the UA 106. More specifically, the service 103 can be configured to transmit a screen that is usable to select function information to be registered in the UA 106, which is a part of the function information (e.g., print function information including print settings) provided by the service 103 and all of the information required to register the function information selectable on the screen, to the UA 106, in response to the HTML request responding to the pressing of the "save" button 1608 illustrated in FIG. 13. Further, the UA 106 can be configured to acquire user selected function information from the above-mentioned already received information and register the acquired function information in the UA 106.

FIG. 17 is a flowchart illustrating processing that can be performed by the image forming apparatus 104 having an additional print setting function to transmit a response including a print setting HTML document to the UA 106. To realize the processing of each step in the flowchart illustrated in FIG. 17, the CPU 301 of the image forming apparatus 104 reads and executes a characteristic control program according to the present invention that can be loaded from a nonvolatile storage device (e.g., the ROM 302 or the HDD 305). In FIG. 17, processing similar to that illustrated in FIG. 11 is assigned the same reference numeral and redundant description thereof will be avoided.

In the "ID designated print settings extraction" processing to be performed in step S1306, the image forming apparatus 104 extracts regular setting values having been set beforehand if the ID parameter starts with "p" and extracts added print settings if the ID parameter starts with "c".

If the image forming apparatus 104 completes the setting reflecting HTML generation in step S1308, then in step S2001, the image forming apparatus 104 determines whether the settings generated in the above-mentioned step S1308 are the added print settings. If the image forming apparatus 104 determines that the generated settings are not the added print settings (No in step S2001), then in step S1309, the image forming apparatus 104 transmits a response including the HTML document generated in the above-mentioned step S1308 to the UA 106.

On the other hand, if the image forming apparatus 104 determines that the settings generated in step S1308 are the added print settings (Yes in step S2001), the operation proceeds to step S2002. In step S2002, the image forming apparatus 104 compares a revision number designated by the URL parameter with a revision number of the added print settings designated by the ID information stored in the image forming apparatus 104. If the image forming apparatus 104 determines that the compared revision numbers coincide with each other (Yes in step S2002), then in step S1309, the image forming apparatus 104 transmits a response including the HTML document generated in the above-mentioned step S1308 to the UA 106.

On the other hand, if the image forming apparatus 104 determines that the compared revision numbers do not coincide with each other (No in step S2002), the operation proceeds to step S2003. In step S2003, the image forming apparatus 104 adds an HTML element required to display an indication that the print settings have been changed and an intent tag required to register a new revision to the HTML document generated in the above-mentioned step S1308. In this case, the response to be transmitted to the UA 106 by the image forming apparatus 104 in step S1309 includes the HTML document including "registration" and "warning" added in the above-mentioned step S2003. If the UA 106 receives the HTML document added in step S2003 and transmitted in step S1309, the UA 106 displays a screen illustrated in FIG. 18A.

Figures 18A, 18B:
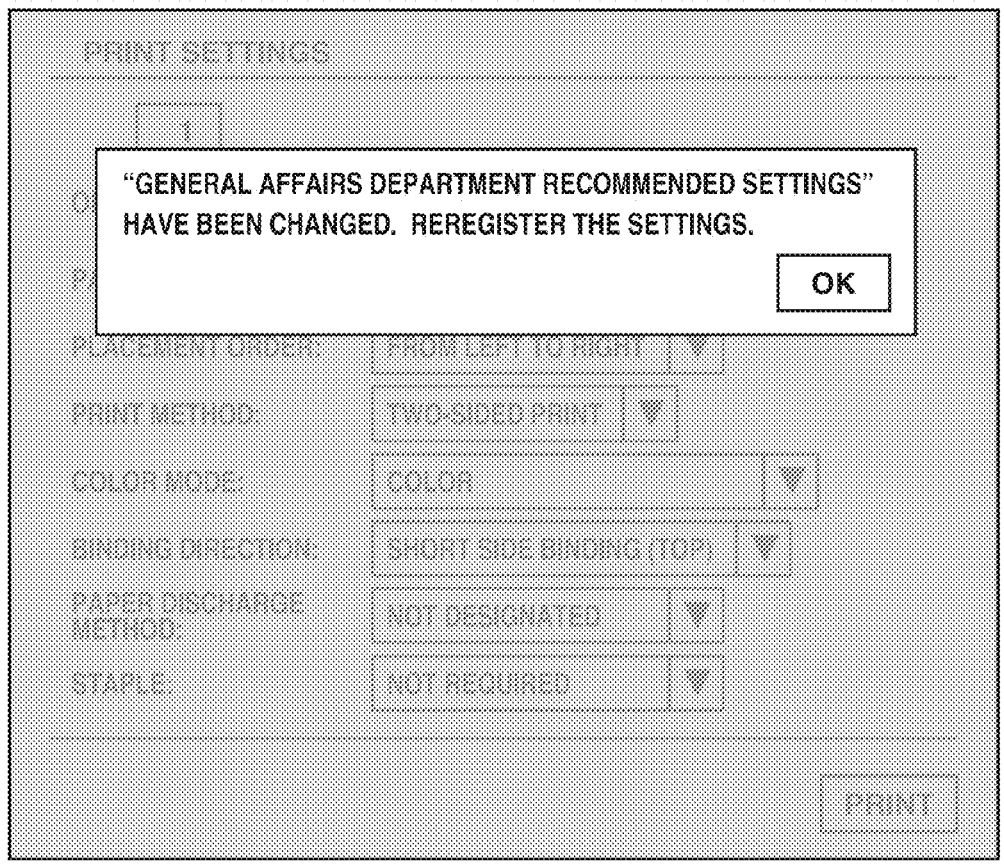
FIGS. 18A and 18B illustrate a screen for notifying a user of inconsistency with respect to revision of function information and an example of the WebIntent registration intent tag.

FIG. 18A illustrates an example of the HTML document added in step S2003 and displayed on the UA 106.

FIG. 18B illustrates an example of the intent tag, which is included in the HTML document added in step S2003 to register the updated and added print settings as WebIntent in the UA 106.

Further, if the UA 106 detects a pressing of the OK button on the screen illustrated in FIG. 18A, the UA 106 displays a dialog that allows the user to confirm the necessity of Intent registration corresponding to the intent tag illustrated in FIG. 18B. Then, if the UA 106 detects a registration instruction from the user via the above-mentioned dialog, the UA 106 registers the information included in the above-mentioned intent tag in an internal storage device thereof. Alternatively, the UA 106 can register the information included in the above-mentioned intent tag in the internal storage device thereof, without displaying the above-mentioned confirmation dialog.

As mentioned above, the system according to the first exemplary embodiment can customize a single service to be registered as Web Intents in the UA 106 in such a way as to register a plurality of different intents considering each usage. As a result, the present invention can provide a user-friendly system that does not require each user to repeat the same operation. In other words, the present invention can improve the usability of the presently proposed Web Intents or any other new cooperation mechanism.

A second exemplary embodiment is characterized in that user authentication is required in accessing the image forming apparatus 104 described in the first exemplary embodiment. More specifically, each user needs to be subjected to user authentication before displaying the selection screen (FIG. 6 or FIG. 15), the print setting screen (FIG. 12A or FIG. 14), and the editing screen (FIG. 13) with respect to the print settings of the image forming apparatus 104 to be registered on the UA 106 according to the first exemplary embodiment. In the following description, features similar to those already described in the first exemplary embodiment are not mentioned specifically and only different features will be described in detail.

FIG. 19A illustrates an example of the print setting registration selection screen (which corresponds to FIG. 15 in the first exemplary embodiment) according to the second exemplary embodiment.

The selection screen illustrated in FIG. 19A includes a list of user-defined print settings 2301 added by an individual user in addition to the list of print settings 1801 having been set by an administrator of the image forming apparatus 104.

The selection screen illustrated in FIG. 19A further includes an "editing" link 2302 and a "deletion" link 2303 that enable a user to edit or delete the user-defined print settings added by the user. Further, a "new addition" button 2304 is operable to add user-defined print settings. If the image forming apparatus 104 detects a pressing of the "editing" link 2302 or the "new addition" button 2304 via the UA 106, the image forming apparatus 104 generates an HTML document dedicated to editing and new addition of user-defined print settings and transmits the generated HTML document to the UA 106. When the UA 106 receives the above-mentioned HTML document, the UA 106 displays a user-defined print setting editing screen. The plurality of pieces of selectable function information displayed in the list 1801 and the list 2301 belongs to the same category ("share" or "view" corresponding to the print function category according to the example illustrated in FIG. 19A).

Further, the user-defined print setting editing screen is similar to FIG. 14. If the image forming apparatus 104 detects a pressing of the "save" button 1703 via the UA 106, the image forming apparatus 104 stores the print setting name designated by the registration name 1701 and the print settings designated by the controls 1702, in association with each user, in a built-in storage device (e.g., the HDD 305) of the image forming apparatus 104. In storing the user-defined print settings, the image forming apparatus 104 assigns a user identifier capable of identifying each user and a print setting identifier capable of identifying the user-defined print settings to the user-defined print settings and stores the assigned identifiers. As mentioned above, a processing apparatus (e.g., the image forming apparatus 104) that functions as the service 103 can manage user-defined function information, which is a part of a plurality of pieces of function information (e.g., print function information including print settings) that can be selectively registered in the UA 106 for each user count (i.e., each user identifier).

FIG. 19B illustrates an example of the WebIntent registration intent tag included in the HTML document which the image forming apparatus 104 transmits to the UA 106 when a user selects "usual print settings" and presses the "registration" button 1802 on the screen illustrated in FIG. 19A.

As illustrated in FIG. 19B, an "id" value of href in the intent tag is constituted by "u" representing user-defined print settings and identifier "60c181fe4" identifying the print settings. In the case of user-defined print settings, the image forming apparatus 104 does not add any rev parameter to href because of unnecessity of management with respect to changes.

Hereinbelow, processing including transmitting a response including a setting HTML document to the UA 106, which can be performed by the image forming apparatus 104 having the capability of adding user-defined print settings according to the second exemplary embodiment, is described in detail below with reference to FIG. 17. Portions different from those described in the first exemplary embodiment are mainly described.

When the image forming apparatus 104 receives the HTML request from the UA 106 in step S1301, the image forming apparatus 104 confirms the presence of user authentication information in the HTML request. If it is determined that there is not any user authentication information, the image forming apparatus 104 performs user authentication processing. Then, the operation proceeds to step S1302.

Further, in the "ID designated print settings extraction" processing to be performed in step S1306, if the ID parameter starts with "u", the image forming apparatus 104 extracts user-defined print settings having ID information designated and saved by the authenticated user from the storage device thereof.

As mentioned above, in addition to the effects described in the first exemplary embodiment, the second exemplary embodiment brings capabilities of customizing services to be registered as Web Intents in the UA 106 and registering them as a plurality of different intents for respective users.

A third exemplary embodiment is characterized in that a WebIntent service 103 can provide a file stored in a storage service using a WebIntent pick action (which is generally referred to as "storage service") as described below.

As an example, in a case where a file is attached to an electronic mail generated by an electronic mail application of a web base, the file to be attached is selected from the above-mentioned WebIntent service. In this case, the electronic mail application of the web base serves as a WebIntent client 101.

Figure 20:
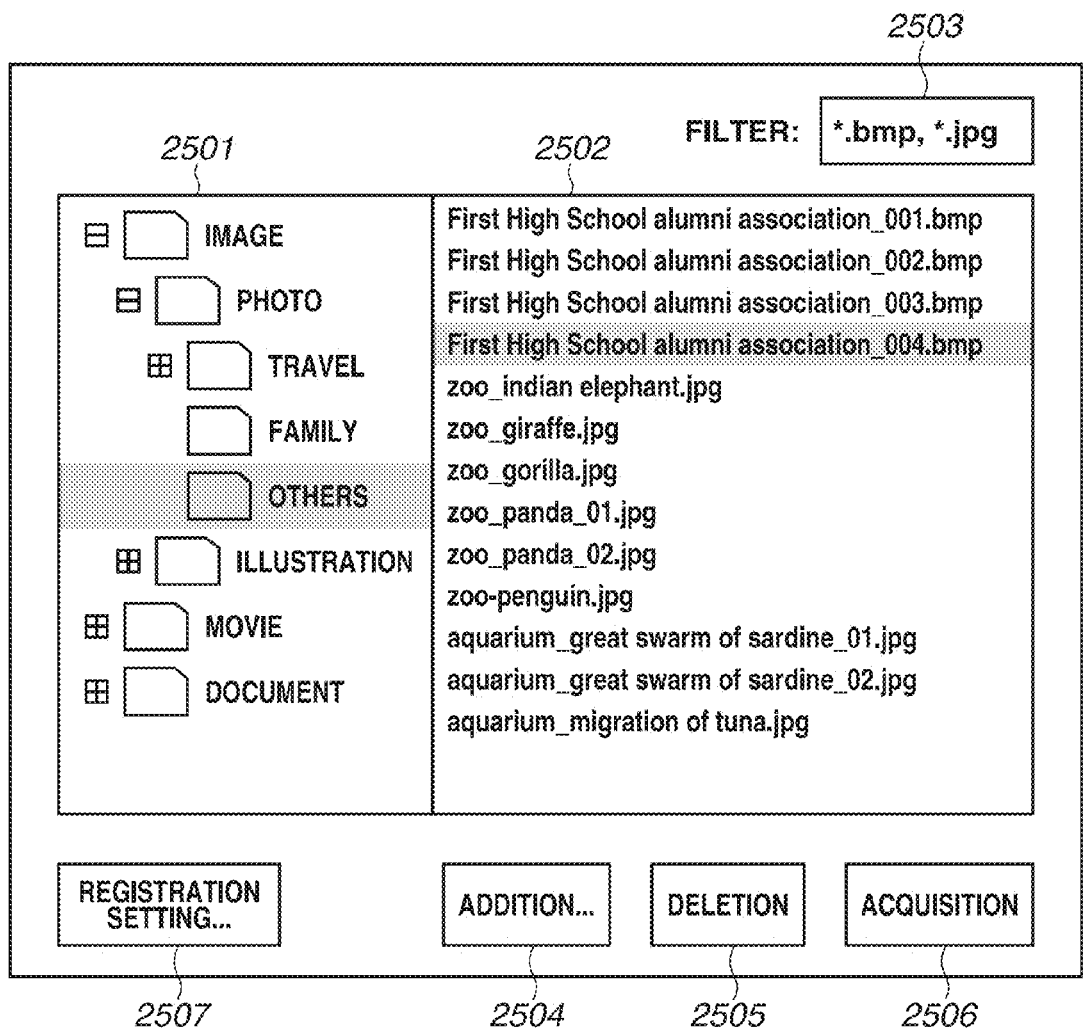
FIG. 20 illustrates an example of a UI screen usable to operate files on a storage service according to a third exemplary embodiment.

FIG. 20 illustrates an example of a UI screen (i.e., a screen usable to operate files in the storage service) that can be displayed by the UA 106 based on an HTML document transmitted by the service 103 to operate files in the service 103.

The UI screen illustrated in FIG. 20 includes a UI component field 2501 and a UI component field 2502. A list of folders that are provided to store files in the service 103 is displayed in the UI component field 2501, in which each folder is selectable independently. The folder list has a hierarchical structure, in which display/non-display of each sub folder of a folder can be switched and selection of a folder is feasible according to a user operation. The example illustrated in FIG. 20 indicates a state that an "others" folder is selected in a "photo" folder that belongs to an "image" folder.

A list of files belonging to the folder selected in the UI component field 2501 is displayed in the UI component field 2502 so that each file can be selected independently. More specifically, a list of files that coincide with a search condition entered in a text entry field 2503 is displayed in the UI component field 2502. According to the example illustrated in FIG. 20, the designated search condition is a file whose extension is "bmp" or "jpg" and a file "First High School alumni association_004.bmp" is selected.

When the user presses an "addition" button 2504, the service 103 transmits an HTML document, which is required to display a screen on the UA 106, to the UA 106 (although not illustrated). The screen displayed based on the transmitted HTML document allows the user to add a file to the folder selected in the UI component field 2501. Further, when the user presses a "deletion" button 2505, the service 103 deletes the file selected in the UI component field 2502 from the storage device of the service 103. Further, when the user presses an "acquisition" button 2506, the service 103 transmits the file selected in the UI component field 2502 from the storage device of the service 103 to the UA 106.

Further, when the user presses a "registration setting" button 2507, the service 103 transmits an HTML document to the UA 106. A screen displayed based on the transmitted HTML document allows the user to set a WebIntent to be registered in the UA 106.

Figure 21:
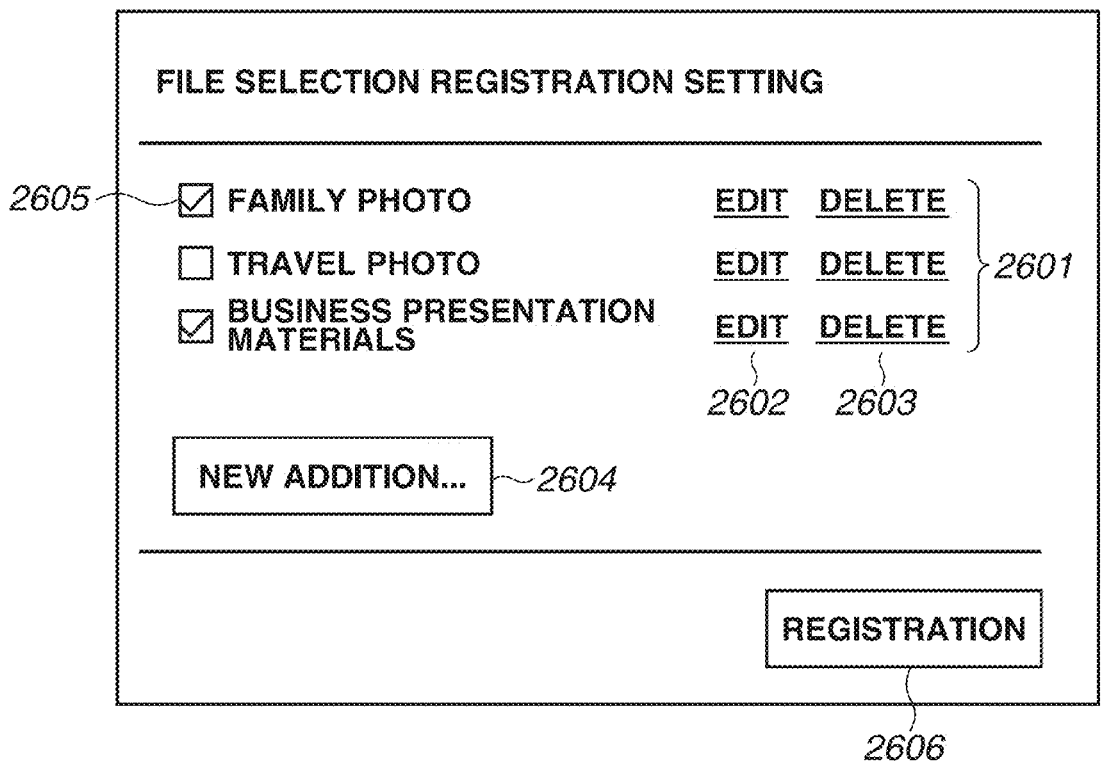
FIG. 21A illustrates an example of a screen usable to perform registration setting of Web Intents according to the third exemplary embodiment.
FIG. 21B illustrates an example of the WebIntent registration intent tag according to the third exemplary embodiment.

FIG. 21A illustrates an example of a WebIntent registration setting screen that is displayed on the UA 106 when the "registration setting" button 2507 illustrated in FIG. 20 is pressed.

The setting screen illustrated in FIG. 21A includes a list 2601 of WebIntent registration settings registered by a user. The setting screen illustrated in FIG. 21A further includes a "new addition" button 2604 that is operable to open a screen to newly add registration settings, a link 2602 that is operable to open a screen to change the content of intended registration settings, a link 2603 that is operable to delete intended registration settings, and a "registration" button 2606 that is operable to register the WebIntent having been set as a registration target to the UA 106. If the UA 106 detects a pressing of the "registration" button 2606, the UA 106 transmits information about the selection state of each check box 2605 to the service 103. The service 103 transmits an HTML document including an intent tag corresponding to the selected registration setting to the UA 106. The plurality of pieces of selectable function information displayed in the list 2601 belongs to the same category ("Pick" corresponding to data acquiring category according to the example of FIG. 21A).

FIG. 21B illustrates an example of the WebIntent registration intent tag included in the HTML document transmitted from the service 103 to the UA 106 when the "registration" button 2606 is pressed in the state illustrated in FIG. 21A.

As illustrated in FIG. 21B, the intent tag includes href in which URI parameters "path" and "filter" indicate a path of a folder in the service storing data to be acquired and a file name search condition, respectively. When the UA 106 receives the HTML document including the above-mentioned intent tag, the UA 106 displays a screen that allows a user to confirm whether to register the WebIntent if the WebIntent is not yet registered. If the UA 106 detects a user's selection of WebIntent registration, the UA 106 registers the information included in the above-mentioned intent tag in the internal storage device thereof.

Figure 22:
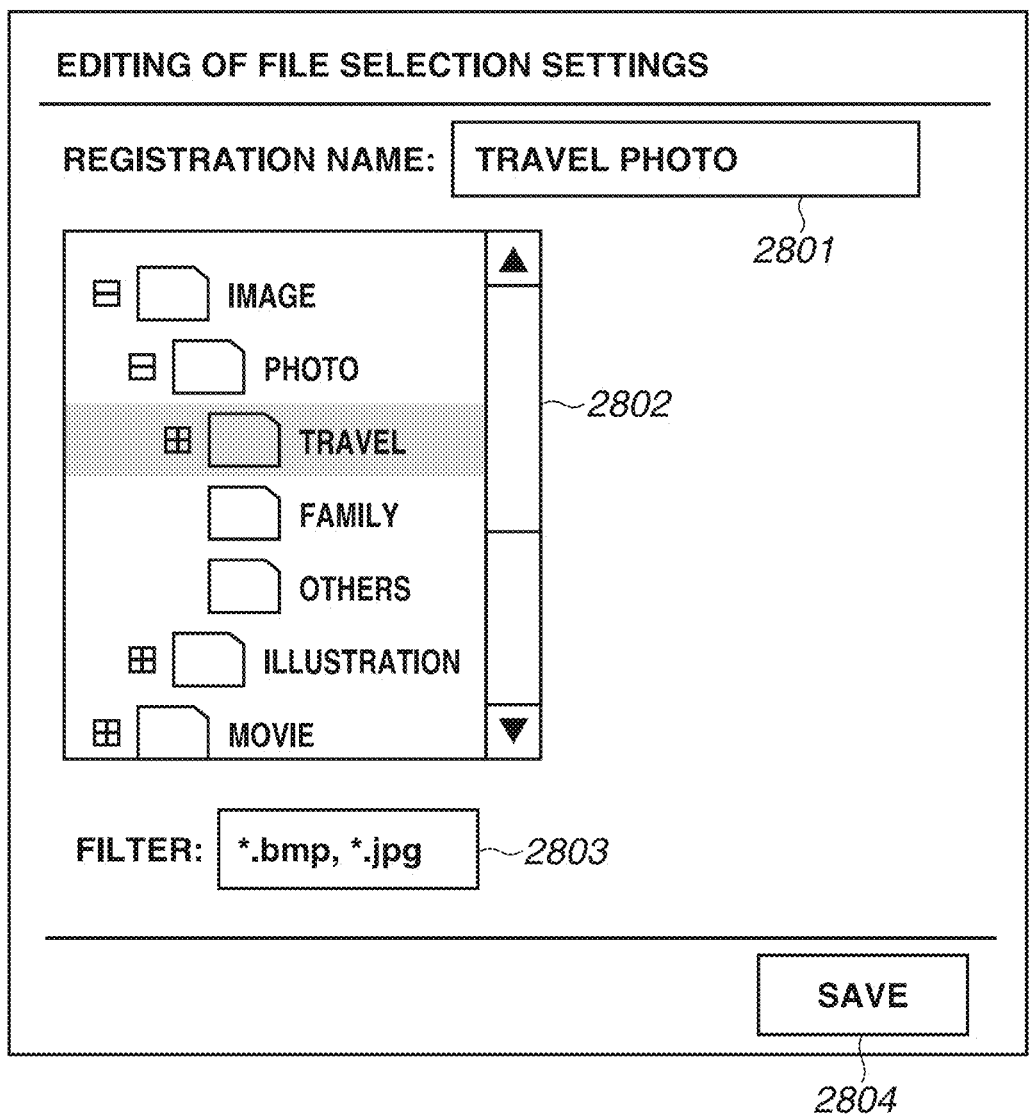
FIG. 22 illustrates an example of a registration setting editing screen according to the third exemplary embodiment.

FIG. 22 illustrates an example of a registration setting editing screen that is displayed on the UA 106 when the "editing" link 2602 or the "new addition" button 2604 is pressed on the screen illustrated in FIG. 21A.

The editing screen illustrated in FIG. 22 includes a text box 2801 in which a registration name can be entered. Each input value can be displayed in a registration setting list 2601 illustrated in FIG. 20. When the editing screen is displayed in response to a pressing of the "editing" link 2602, the text box 2801 becomes uneditable. The editing screen illustrated in FIG. 22 further includes a UI component field 2802 that allows a user to select a folder that stores a file to be acquired and a text box 2803 that is usable to enter a file name search condition with respect to a file or files to be acquired. According to the example illustrated in FIG. 22, a file whose extension is "bmp" or "jpg" is designated in the text box 2803. If the UA 106 detects a pressing of a "save" button 2804, the UA 106 transmits character strings entered in respective text boxes 2801 and 2803 and the folder path selected in the UI component field 2802 to the service 103. The service 103 stores the information having been received from the UA 106 (i.e., the registration name, the folder path, and the search condition) in association with each user (i.e., an identifier that identifies each user) in the storage device thereof. The service 103 transmits an HTML document required to display a file operation screen illustrated in FIG. 20 to the UA 106. Thus, in a state where the folder to be selected is selected in the UI component field 2802 and the search condition is entered in the text box 2803, a file selection registration setting capable of accessing the UI screen (FIG. 20) of the storage service can be added to the list 2601 illustrated in FIG. 21A.

FIG. 23 is a sequence diagram illustrating a procedure of processing in which the service 103 transmits a file to the client 101 via the UA 106 in response to a WebIntent pick request from the client 101. In the present exemplary embodiment, the client 101 is, for example, an electronic mail application of the web base. Through the processing illustrated in FIG. 23, a file attached to an electronic mail can be acquired from the service 103.

First, in step S2901, the UA 106 transmits an HTML GET request to the client 101. In step S2902, in response to the above-mentioned request, the client 101 transmits an HTML document indicating the usage of a WebIntent pick function to the UA 106. The UA 106 receives the HTML document transmitted from the client 101 and displays a screen based on the received HTML document. Further, if the UA 106 detects a WebIntent launching request from the HTML document based screen, then in step S2903, the UA 106 displays a list of registered WebIntents that can process the pick request.

If the UA 106 detects a user's WebIntent selection in the service 103, from the above-mentioned list, then in step S2904, the UA 106 generates an Intent object according to a description in the HTML document and transmits an HTML request to URI described in the intent tag of the selected WebIntent.

If the service 103 receives the HTML request including the Intent object, the service 103 transmits an HTML document required to display a screen that allows a user to operate a file in the service 103 illustrated in FIG. 20 according to a folder and search settings described in the requested URI parameter to the UA 106. If the UA 106 receives the HTML document transmitted from the service 103, the UA 106 displays a UI screen based on the received HTML document. For example, if a "family photo" is selected from the WebIntent list, a "family" folder is selected from the "photo" folder belonging to the "image" folder in the UI component field 2501 illustrated in FIG. 20 and an UI screen is displayed on the UA 106, in a state where a file whose extension is "bmp" or "jpg" is designated as the search condition in the UI component field 2502 illustrated in FIG. 20. Therefore, the user is not required to select a folder that serves as an image acquiring source and input a search condition. User burden can be reduced significantly in an image acquiring operation.

The user selects an intended file from the HTML document based UI screen, via the UA 106, and presses the "acquisition" button 2506 to select a file to be attached to an electronic mail. If the service 103 detects a pressing of the "acquisition" button 2506 by the user via the UA 106, then in step S2906, the service 103 transmits an HTML document including the file selected on the screen to the UA 106.

The UA 106 receives the HTML document and calls a window.intent.postResult function included in the HTML document, thereby notifying the UA 106 of completion of WebIntent calling processing by the service 103. In this case, the content of the selected file is transmitted to the function. Accepting the above-mentioned function calling, in step S2908, the UA 106 calls a WebIntent calling success callback function that is included in the HTML document received in step S2902. In step S2909, the UA 106 transmits the content of the selected file to the client 101 according to the above-mentioned function calling.

In the present exemplary embodiment, pick.html processing to be performed by the service 103 includes transmitting only the file being currently selected to the UA 106 in response to a pressing of the "acquisition" button 2506 by the user if a request from the UA 106 does not include any Intent object.

Further, in the above-mentioned example, acquiring a file from the storage service and transmitting the acquired file to the client 101 (e.g., the electronic mail application in the web base) have been described. On the other hand, data acquired from the client 101 may be stored in the storage service.

As mentioned above, according to the third exemplary embodiment, for example, if the function (providing function) provided by the Web Intents mechanism includes data acquisition and storage functions, each user is not required to select a folder serving as a data acquisition source or a storage destination or designate a classification in a data selection operation. Thus, user burden can be reduced.

As mentioned above, in each of the above-mentioned exemplary embodiments, information required to selectively register a plurality of pieces of function information corresponding to processing performed based on different settings of a function provided by the service 103 in the information processing terminal is transmitted to the UA 106. The UA 106 receives the transmitted information. Then, the UA 106 performs the function information registration processing using the relay function, according to a selection based on the received information. Further, according to a designation of specific data acquired from the client 101 and a selection of registered function information, the UA 106 requests the service 103 to process the specific data based on the settings corresponding to the selected function information. The service 103 processes the specific data based on the settings corresponding to the selected function information in response to the above-mentioned request. Then, the service 103 transmits a processing result to the UA 106. The above-mentioned configuration is advantageous in that no user operation is required (i.e., each user is not required to frequently repeat the same operation) in the WebIntent processing. In other words, the present exemplary embodiment can improve usability in the request to a service using the new cooperation mechanism represented by the Web Intents and the registration of Web Intents.

The configuration and contents of various data are not limited to the above-mentioned examples and can be modified in various ways considering intended usage or purposes.

The present invention is not limited to only the above-mentioned exemplary embodiments. The present invention can be realized, for example, as a system, an apparatus, a method, a program, or a storage medium. For example, the present invention can be applied to a system including a plurality of devices or can be applied to an apparatus constituted by a single device.

Further, the present invention encompasses all of possible combinations of the above-mentioned exemplary embodiments.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-005183 filed Jan. 15, 2014, which is hereby incorporated by reference herein in its entirety.

What is claimed is:

1. An information processing terminal comprising a memory storing instructions for a relay function of causing a client that manages data to cooperate with a service that provides a function using the data manacled by the client via a network, and a processor which is capable of executing the instructions causing the information processing terminal to:
    execute a transmission of a first request to the service;
    receive, from the service, information required to selectively register a plurality of pieces of function information as a response to the first request, wherein the plurality of pieces of function information corresponds to processing capable of being performed, based on different settings, using a function provided by the service;
    execute a transmission of a second request to the service, according to a selection based on the received information;
    perform registration processing of the function information using the relay function, according to a response to the second request from the service; and
    request the service, according to a designation of specific data managed by the client and a selection of registered function information, to process the specific data based on settings corresponding to the selected function information,
    wherein the relay function is provided as a web browser function of the information processing terminal.

2. The information processing terminal according to claim 1, wherein each of the plurality of pieces of function information belongs to a same category.

3. The information processing terminal according to claim 2, wherein the category includes at least one of a category sharing the specific data, a category editing the specific data, a category browsing the specific data, a category acquiring the specific data, and a category storing the specific data.

4. The information processing terminal according to claim 1, wherein the plurality of pieces of function information can be edited via the service.

5. The information processing terminal according to claim 4, wherein a change, caused by editing, of the plurality of pieces of function information can be managed by the service.

6. The information processing terminal according to claim 4, wherein the plurality of pieces of function information can be managed for each user identifier.

7. The information processing terminal according to claim 1, wherein the instructions further cause the information processing terminal to:
    receive, from the service, a screen usable to register the plurality of pieces of function information that can be selectively registered based on the received information in the service beforehand, and register, via the received screen, function information as an option selectable in the registration, in the service.

8. The information processing terminal according to claim 1, wherein the client and the relay function are functions of the information processing terminal.

9. The information processing terminal according to claim 1, wherein the network is the internet.

10. A method for controlling an information processing terminal that has a relay function of causing a client that manages data to cooperate with a service that provides a function using the data that is managed by the client, via a network, the control method comprising:

executing a transmission of a first request to the service;

receiving, from the service, information required to selectively register a plurality of pieces of function information as a response to the first request, wherein the plurality of pieces of function information corresponds to processing capable of being performed using a function provided by the service;

executing a transmission of a second request to the service, according to a selection based on the received information;

performing function information registration processing using the relay function, according to a response to the second request from the service; and requesting the service, according to a designation of specific data managed by the client and a selection of registered function information, to process the specific data based on settings corresponding to the selected function information, wherein the relay function is provided as a web browser function of the information processing terminal.

11. The method according to claim 10, wherein each of the plurality of pieces of function information belongs to a same category.

12. The method according to claim 10, wherein the plurality of pieces of function information can be edited via the service.

13. The method according to claim 10, further comprising:

receiving, from the service, a screen usable to register the plurality of pieces of function information that can be selectively registered based on the received information in the service beforehand, and registering, via the received screen, function information as an option selectable in the registration, in the service.

14. The method according to claim 10, wherein the client and the relay function are functions of the information processing terminal.

15. A non-transitory computer readable storage medium on which is stored a computer program for making a computer execute a control method for an information processing terminal that has a relay function of causing a client that manages data to cooperate with a service that provides a function using the data that is managed by the client, via a network, the method comprising:

executing a transmission of a first request to the service;

receiving, from the service, information required to selectively register a plurality of pieces of function information as a response to the first request, wherein the plurality of pieces of function information corresponds to processing capable of being performed using a function provided by the service;

executing a transmission of a second request to the service, according to a selection based on the received information;

performing function information registration processing using the relay function, according to a response to the second request from the service; and requesting the service, according to a designation of specific data managed by the client and a selection of registered function information, to process the specific data based on settings corresponding to the selected function information, wherein the relay function is provided as a web browser function of the information processing terminal.

16. The method according to claim 10, wherein the network is the internet.

17. The non-transitory computer readable storage medium according to claim 15, wherein each of the plurality of pieces of function information belongs to a same category.

18. The non-transitory computer readable storage medium according to claim 15, wherein the plurality of pieces of function information can be edited via the service.

19. The non-transitory computer readable storage medium according to claim 15, further comprising:

receiving, from the service, a screen usable to register the plurality of pieces of function information that can be selectively registered based on the received information in the service beforehand, and registering, via the received screen, function information as an option selectable in the registration, in the service.

20. The non-transitory computer readable storage medium according to claim 15, wherein the client and the relay function are functions of the information processing terminal.

21. The non-transitory computer readable storage medium according to claim 15, wherein the network is the internet.

* * * * *